United States Patent
Yamada et al.

(10) Patent No.: US 6,612,709 B2
(45) Date of Patent: *Sep. 2, 2003

(54) LIGHTING DEVICE AND DISPLAY DEVICE USING THE LIGHTING DEVICE

(75) Inventors: Fumiaki Yamada, Kawasaki (JP); Shinpei Nagatani, Kawasaki (JP); Masaki Miyahara, Kawasaki (JP); Eiji Nittou, Kawasaki (JP)

(73) Assignee: Fujitsu Display Technologies Corporation, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,498

(22) Filed: Sep. 11, 1997

(65) Prior Publication Data

US 2001/0012202 A1 Aug. 9, 2001

Related U.S. Application Data

(62) Division of application No. 08/816,489, filed on Mar. 13, 1997, now Pat. No. 5,704,703, which is a continuation of application No. 08/204,686, filed on Mar. 2, 1994, now abandoned.

(30) Foreign Application Priority Data

Mar. 3, 1993 (JP) ............................................. 5-042572
Sep. 10, 1993 (JP) ............................................. 5-226216

(51) Int. Cl.⁷ ................................................. F21V 7/04
(52) U.S. Cl. ............................................. 362/31; 362/26
(58) Field of Search ..................................... 362/31, 26

(56) References Cited

U.S. PATENT DOCUMENTS 5,005,108 A * 4/1991 Pristash et al. ............... 362/31
5,050,946 A   9/1991 Hathaway et al. ........ 362/31 X
5,079,675 A * 1/1992 Nakayama .................... 362/31
5,394,255 A * 2/1995 Yokota et al. ............. 362/31 X
5,408,388 A   4/1995 Kobayashi et al. ........... 362/31
5,414,599 A   5/1995 Kaneko et al. ........... 362/27 X
5,438,484 A   8/1995 Kanda et al. .................. 362/31

FOREIGN PATENT DOCUMENTS

| JP | 61-86709  | 5/1986 |
| JP | 61-246702 | 11/1986 |
| JP | 62-027306 | 2/1987 |
| JP | 63-000324 | 1/1988 |
| JP | 63-33703  | 2/1988 |
| JP | 63-073789 | 5/1988 |
| JP | 64-45003  | 2/1989 |
| JP | 01-085781 | 6/1989 |
| JP | 01-261692 | 10/1989 |
| JP | 2-165504  | 6/1990 |
| JP | 03-005129 | 1/1991 |
| JP | 03-037420 | 4/1991 |
| JP | 3-111819  | 5/1991 |
| JP | 03-005725 | 11/1991 |
| JP | 04-006706 | 1/1992 |

\* cited by examiner

*Primary Examiner*—Stephen Husar
(74) *Attorney, Agent, or Firm*—Arent Fox Kintner Plotkin & Kahn

(57) ABSTRACT

A lighting device includes a light source, a light conducting plate having an incident surface receiving light emitted from the light source, a back surface and a light-emitting surface, and a reflection member having a first portion facing the back surface, and a second portion located on a side opposite to a side of the light conducting plate on which the light source is located. The second portion is spaced apart from the light conducting plate so that light emitted from the light conducting plate is oriented toward an emission surface of the lighting device.

7 Claims, 36 Drawing Sheets

FIG.19
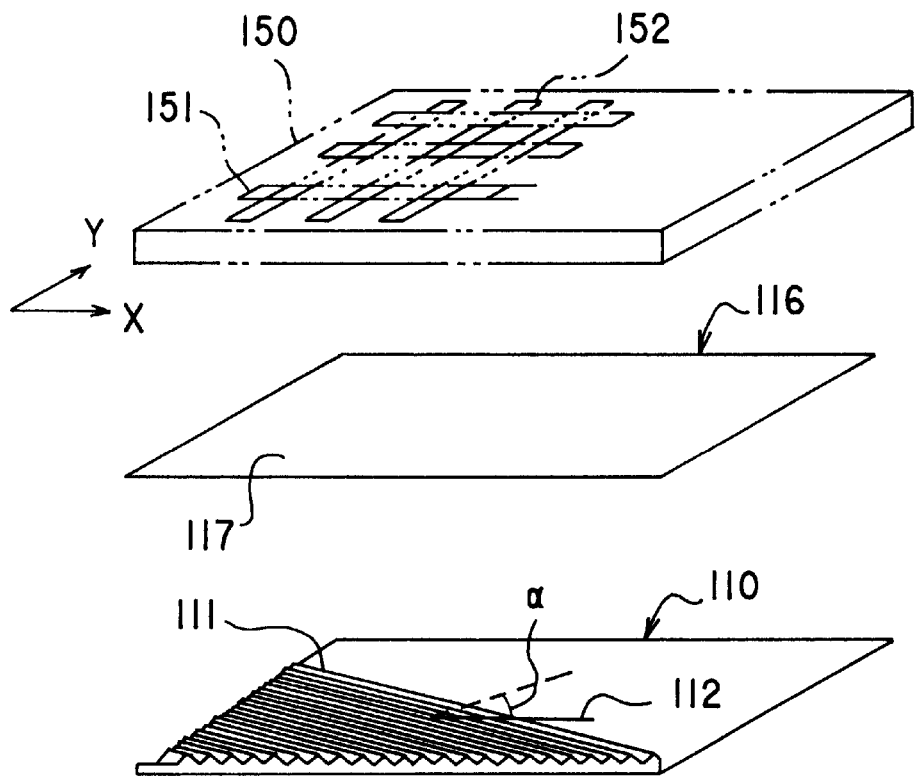
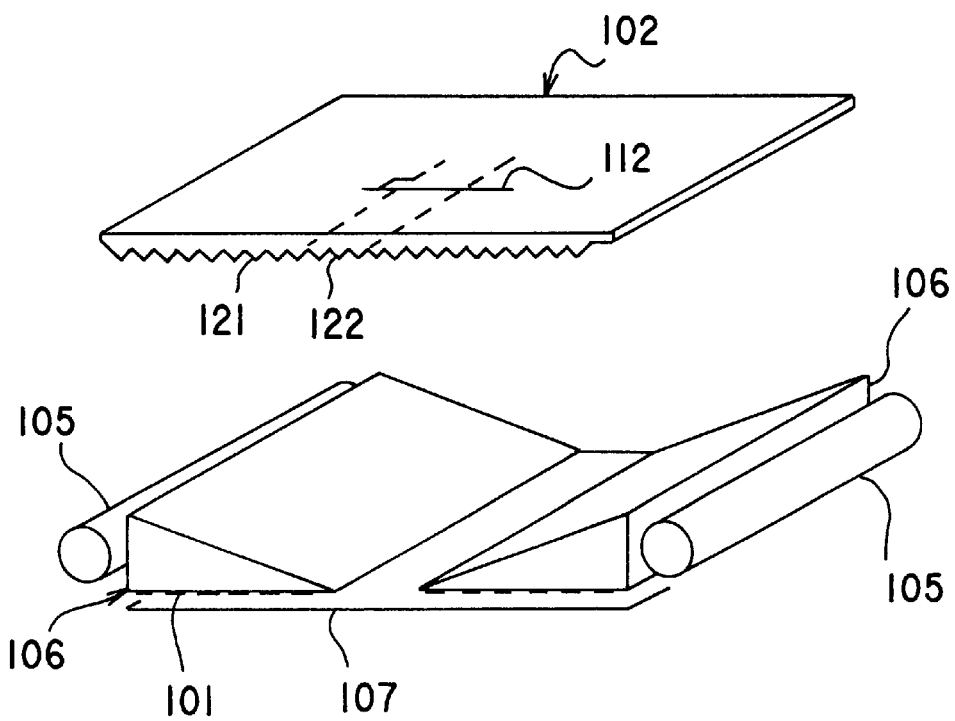

DISTANCE FROM INCIDENT
SURFACE 106a r2 < r1
h2 > h1

LIGHTING DEVICE AND DISPLAY DEVICE USING THE LIGHTING DEVICE

This is a division of application Ser. No. 08/816,489 filed Mar. 13, 1997, now U.S. Pat. No. 5,704,703, which in turn is a continuation of application Ser. No. 08/204,686, filed Mar. 2, 1994, now abandoned.

BACKGROUND OF THE INVENTION

Field of the Invention

The present invention generally relates to lighting devices, and more particularly to a lighting device applied to a back-lighting device of a transmitted type liquid crystal display device.

Recently, a display unit has widely been employed in wordprocessors, personal computers or the like together with improvements in the display capacity and lighting performance. Further, it has been required to provide thin and light display units applicable to notebook-type devices and workstations using a large-size display. Particularly, there has been considerable activity in the development of high-luminance color display units. Under these situations, it has been necessary to provide high-luminance, high-efficiency lighting devices.

An edge light type back-lighting device has been applied to a liquid crystal display device. In such a type of back-lighting device, light is incident to a side surface of a transparent light conducting plate. The incident light is propagated through the light conducting plate so that the light is totally reflected at an interface of the light conducting place. The light conducting plate has a slope at its center portion, and is provided with white ink portions. Hence, the condition for total reflection is broken and the light is emitted via a light-emitting surface.

FIG. 1 is a diagram of a conventional edge-light type lighting device 90, which includes two fluorescent tubes 81, a light conducting plate 82 made of a transparent resin, incident surfaces 82a of the light conducting plate 82, a back surface 82b of the light conducting plate 82 on which a diffusion reflection pattern is printed, a light-emitting surface 82c of the light conducting plate 82, a reflection sheet 83, an emission surface 84, reflection mirrors 85 respectively enclosing the fluorescent tubes 81, a linear prism 86, a transparent diffusion sheet 87 and an inner propagation light 88 and an emitted light 89.

As shown in FIG. 1, the fluorescent tubes 81 covered by the reflection mirrors 85 are arranged so that lights emitted therefrom enter into the incident surfaces 82a of the light conducting plate 82. The light conducting plate 82 has slopes from the incident surfaces 82a so that the light conducting plate 82 becomes thinner toward the center thereof from the incident surfaces 82a. These slopes of the light conducting plate 82 form the light-emitting surface 82c. The diffusion reflection pattern which has a weighted white-ink pattern is formed on the back surface 82b so that the printed area of the pattern is increased as the distances from the fluorescent tubes 81 increase. The reflection sheet 83 provided on the surface opposite to the back surfaces 82b functions to efficiently and effectively emit light scattered by the diffusion reflection pattern. The linear prism 86 is provided on the emission surfaces 84 of the light conducting plate 82 in order to effectively collect the emitted light 89 in the normal line direction. Further, the diffusion sheet 87 which prevents the diffusion reflection pattern from being seen from the outside of the lighting device is disposed on the emission side of the linear prism 86.

The diffused lights emitted from the fluorescent tubes 81 enters into the incident surfaces 82a of the light conducting plate 82 and are propagated through the light conducting plate 82 while the condition for total reflection is satisfied. The angle of the inner propagation light 88 becomes sharp by an angle Θ of the light-emitting surface 82c each time the inner propagation light 88 is totally reflected. When the angle of the inner propagation light 88 becomes greater than the critical angle, the light is emitted via the light-emitting surface 82c as the emitted light 89. The inner propagation light 88 totally reflected by the light-emitting surface 82c reaches the back surface 82b is emitted via the emission surface 84 because the diffusion reflection pattern breaks the condition for total reflection.

However, the prior art lighting device has the following disadvantages. All lights emitted from fluorescent tubes 81 are not emitted via the emission surface 84. Some light emitted from one of the fluorescent tubes 81 is propagated through the light conducting plate 82 and is returned to the associated reflection mirror 85. At this time, the returned light hits the reflection mirror 85 and loss of light occurs. Hence, the efficiency in use of light is not good. This problem may be reduced by means of the sloped light-emitting surface 82c of the light conducting plate 82. However, it has not been possible to obtain sufficient and satisfactory lighting performance.

The linear prism plate 86 disposed between the light conducting plate 82 and the diffusion sheet 87 contributes to a reduction in the above loss of light to enhance luminance in the normal line direction. However, an interference will occur unless the pitch of linear prisms of the linear prism plate 86 is optimally selected with respect to the pitch between electrodes arranged in rows and columns of a display panel. Hence, in practice, the diffusion sheet 87 having a high degree of diffusion is used or optimal pitches of the linear prisms are selected with respect to the respective electrode pitches. However, the luminance in the normal line direction is decreased as the degree of diffusion is increased. Further, dies for the respective pitches of the linear prisms must be prepared, which leads to an increase in the production cost.

SUMMARY OF THE INVENTION

It is a general object of the present invention to provide a lighting device in which the above disadvantages are eliminated.

A more specific object of the present invention is to provide a thin, light and efficient lighting device having a high uniform luminance distribution.

The above objects of the present invention are achieved by a lighting device comprising: a light source; a light conducting plate having an incident surface receiving light emitted from the light source, a back surface and a light-emitting surface; and a reflection member having a first portion facing the back surface, and a second portion located on a side opposite to a side of the light conducting plate on which the light source is located, the second portion being spaced apart from the light conducting plate so that light emitted from the light conducting plate is oriented toward an emission surface of the lighting device.

The above objects of the present invention are also achieved by a lighting device comprising: a light source; a light conducting plate having an incident surface receiving light emitted from the light source, a back surface and a light-emitting surface; and a reflection member having a first portion facing the back surface, and a second portion located on a side opposite to a side of the light conducting plate which the light source is located, the light conducting plate comprising a plurality of concave portions which are formed on the back surface and orient light emitted from the light conducting plate via the back surface toward an emission surface of the lighting device, a parameter related to the plurality of concave portions being weighted so that an even luminance distribution can be obtained on the emission surface.

The above objects of the present invention are also achieved by a lighting device comprising: a plurality of units located on a plane; the plurality of units respectively comprising: light sources; light conducting plates, each having an incident surface receiving light emitted from the light sources, a back surface, a light-emitting surface and an edge opposite to the incident surface; and a reflection member facing the back surfaces of the light conducting plate.

The above objects of the present invention are also achieved by a lighting device comprising: a plurality of units located; the plurality of units respectively comprising: light sources; light conducting plates, each having an incident surface receiving light emitted from the light sources, a back surface, a light-emitting surface and an edge opposite to the incident surface; a reflection member facing the back surfaces of the light conducting plate; light diffusing means, formed on the back surface of each of the light conducting plates, for diffusing light traveling in each of the light conducting plates in the vicinity of the incident surface more greatly than in other portions of each of the light conducting plates; a first linear prism plate partially allowing the lights emitted from the light conducting plates to pass through the first linear prism plate and partially reflecting the lights toward a space between the light conducting plates and the first linear prism plate; and a second linear prism plate collecting the lights from the first linear prism plate in a normal-line direction on the emission surface, wherein: the light conducting plates are arranged so that a space is defined by edges of the light conducting plates; and the light-emitting surface of each of the light conducting plates comprises an inclined surface which goes down toward the second portion of the reflection member.

Another object of the present invention is to provide a display device comprising any of the above-mentioned lighting device.

This object of the present invention is achieved by a display device comprising a display panel, a lighting device configured as mentioned above.

BRIEF DESCRIPTION OF THE DRAWINGS

Other objects, features and advantages of the present invention will become more apparent from the following detailed description when read in conjunction with the accompanying drawings, in which:

FIG. 19 is an exploded perspective view of the lighting device shown in FIG. 18;

DESCRIPTION OF THE PREFERRED EMBODIMENTS

Figure 1:
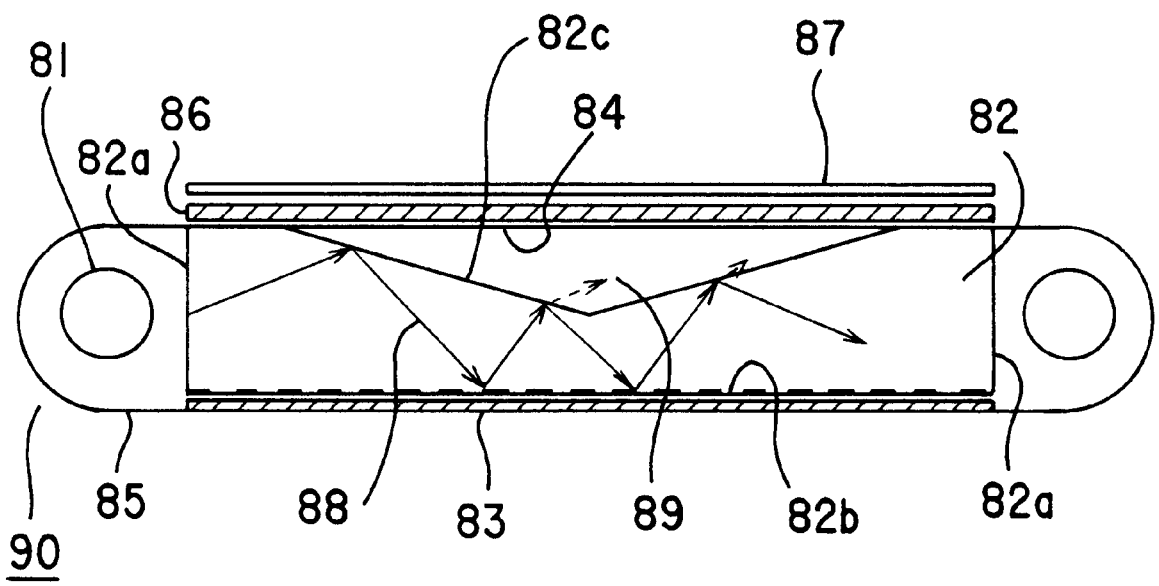
FIG. 1 is a diagram of a conventional edge-light type lighting device.
Figure 2:
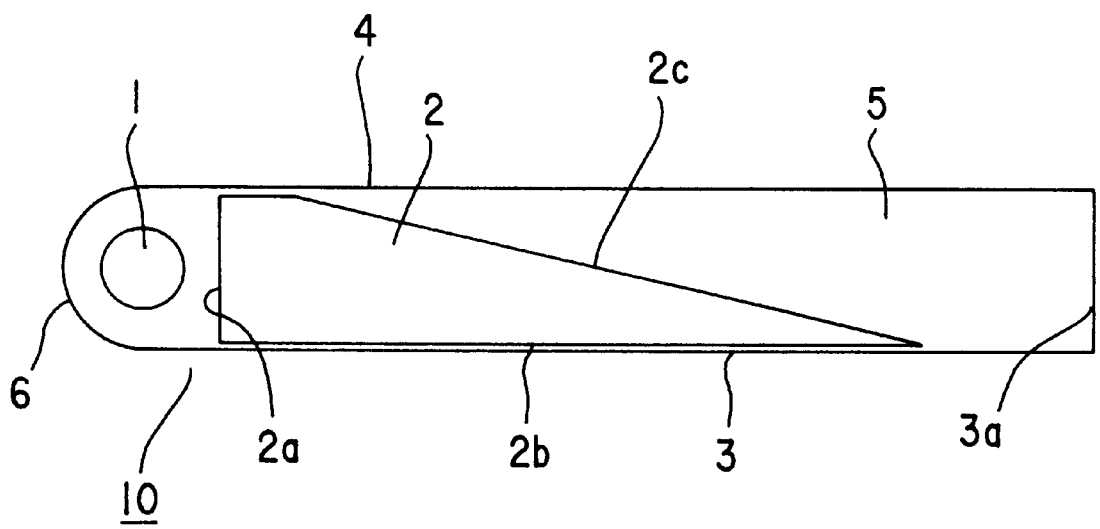
FIG. 2 is a cross-sectional view of a lighting device according to a first embodiment of the present invention.

FIG. 2 is a diagram of a lighting device 10 according to a first embodiment of the present invention. The lighting device 10 shown in FIG. 2 includes a light source 1 formed with, for example, a fluorescent tube, a transparent light conducting plate 2 having an incident surface 2a, a back surface 2b and a light-emitting surface 2c, a reflection member 3 having a reflection surface, a sidewall surface 3a on a side of the light conducting plate 2 opposite to the side thereof on which the light source 1 is provided, an emission surface 4, a space 5, and a reflection mirror 6.

The light-emitting surface 2c of the light conducting plate 2 is formed so that the thickness of the light conducting plate 2 becomes smaller as the distance from the light source 1 increases. The cross section of the light conducting plate 2 is of an approximately right-angled triangle and of a wedge shape. The space 5 is defined by the light-emitting surface 2c, the sidewall surface 3a and the reflection member 3. The most important feature of the first embodiment of the present invention is that the space 5 is provided as described above.

Figure 3:
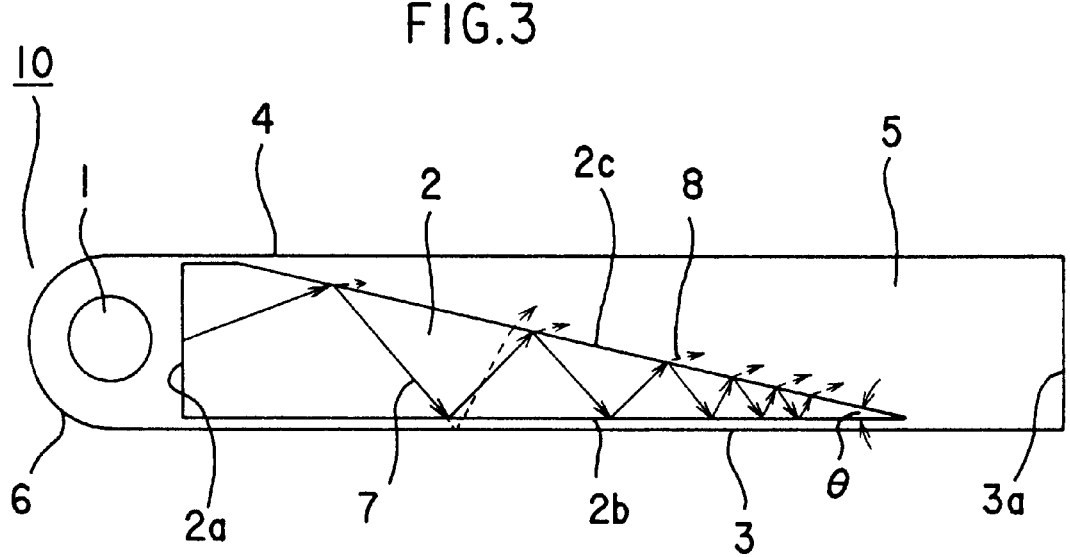
FIG. 3 is a cross-sectional view showing the operation of the lighting device shown in FIG. 2.

FIG. 3 shows the operation of the lighting device shown in FIG. 2. The light emitted from the light source 1 is reflected by the reflection mirror 6 having a cross section of a half circle intended to function to collect light. The light directly coming from the light source 1 and the light reflected by the reflection mirror 6 are combined, and the combined light enters into the light conducting plate 2 via the incident surface 2a.

The light incident to the light conducting plate 2 enters at an angle of approximately ±42° with respect to the normal line of the incident surface according to the Snell's law. If the surfaces of the light conducting plate 2 are vertical to the incident surface 2a, the angle of the light reaching the surfaces of the light conducting plate 2 will be approximately ±48° or greater with respect to the normal line of the surfaces of the light conducting plate 2. Hence, the light will be totally reflected by the surfaces of the light conducting plate 2, and will be propagated through the light conducting plate 2. In the above manner, the propagation light will be emitted via the end surface of the light conducting plate 2 opposite to the incident surface 2a thereof facing the light source 1 if the surfaces of the light conducting plate 2 are vertical to the incident surface 2a.

However, according to the first embodiment of the present invention, the light conducting plate 2 has the sloped light-emitting surface 2c forming an angle Θ with respect to the back surface 2b so that the thickness of the plate 2 becomes thinner as the horizontal distance from the light source 1 increases. Hence, the angle of the propagation light 7 entering into the light conducting plate 2 via the incident light 2a with respect to the light-emitting surface 2c becomes shape (increased) by the angle Θ each time the propagation light 7 is totally reflected by the light-emitting surface 2c. Then, some of the propagation light 7 is emitted, as the emitted light 8, from the light-emitting surface 2c while the total reflection of the propagation light 7 is repeatedly performed, and goes toward the emission surface 4. The remaining of the propagation light 7 is totally reflected repeatedly. Further, some of the propagation light 7 is emitted from the back surface 2b and is then reflected by the reflection surface 3 facing the back surface 2b.

The emitted light 8 includes a component which directly reaches the emission surface 4 and another component which is reflected by the sidewall surface 3a of the reflection member 3 and is then emitted from the emission surface 4.

Figure 4:
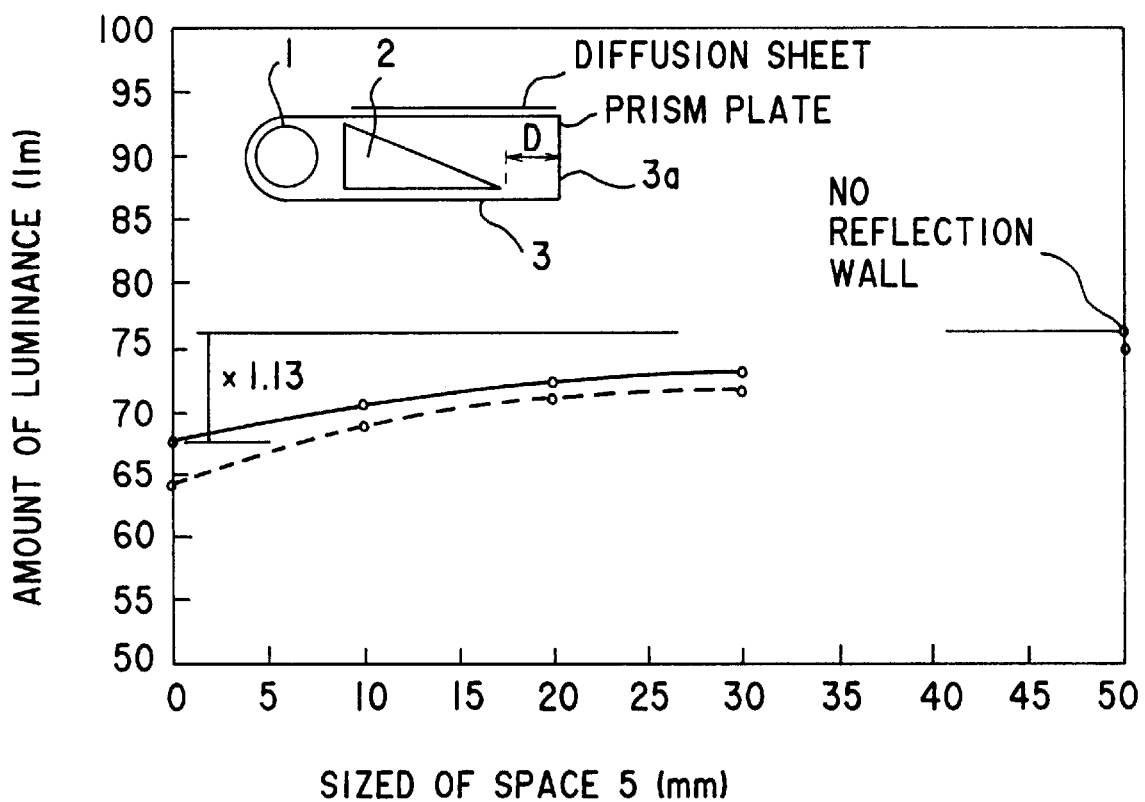
FIG. 4 is a graph showing an effect of a space provided in the lighting device shown in FIG. 2.

FIG. 4 is a graph of the results of an experiment, and more particularly shows the amount of luminance vs. the size D of the space 5 provided in the first embodiment of the present invention. It will be noted that the size D of the space 5 corresponds to the distance between the edge of the light conducting plate 2 and the sidewall surface 3a. The light conducting plate used in the experiment is 5 mm thick and 130 mm long. In the experiment, a linear prism plate and a transparent diffusion sheet were provided as shown in FIG. 4. A solid line curve indicates a characteristic obtained in a case where the reflection member has a mirror surface. A broken line curve indicates a characteristic obtained in a case where the reflection member has a diffusion pattern formed on the surface thereof. It can be seen from the graph of FIG. 4 that the amount of luminance is increased as the size D of the space 5 is increased. It will be noted that a minimum amount of luminance was obtained when the size D of the space 5 is zero, that is, the sidewall surface 3a is in contact with the edge of the light conducting plate 2. Further, a maximum amount of luminance was obtained when the sidewall surface 3a is not provided. In practice, it is preferable to set the distance D to 2 mm or more.

When the sidewall surface 3a is in contact with the edge of the light conducting plate 2, a large amount of light is reflected thereby and loss of light becomes great. Further, in this case, light outgoing from the light conducting plate 2 and directly reaching the emission surface and light reflected by the sidewall surface and reaching the emission surface are superposed in an inner portion of the light conducting plate close to the edge thereof. Hence, an even luminance distribution cannot be obtained.

The space 5 located between the light conducting plate 2 and the sidewall surface 3a and sandwiched between the reflection member 3 and the emission surface 4 functions to introduce most of the emitted light 8 emitted from the light-emitting surface 2c toward the emission surface 4. Hence, an even luminance distribution can be obtained and loss of light can be reduced.

Figure 5A:
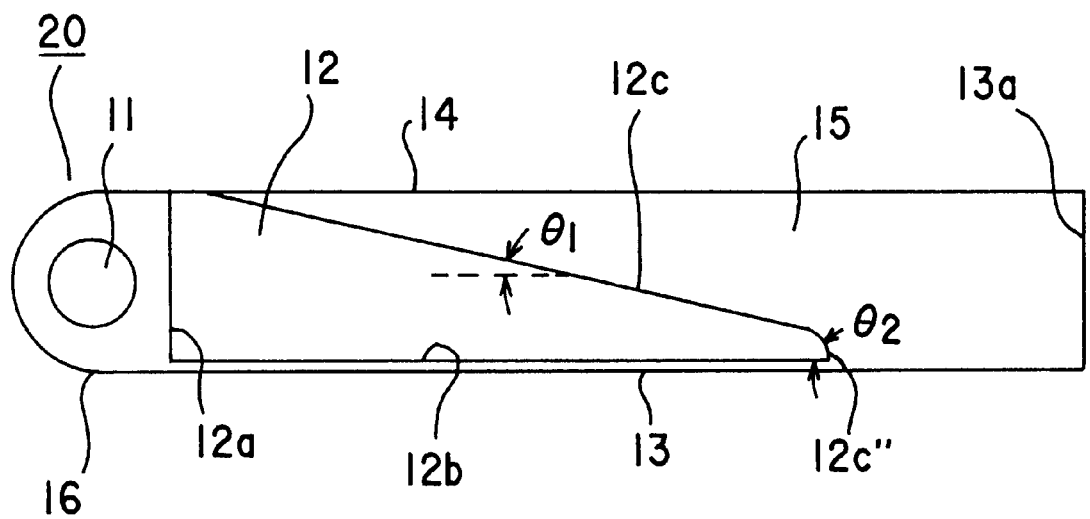
FIG. 5A is a cross-sectional view of a lighting device according to a second embodiment of the present invention.

FIG. 5A is a diagram of a lighting device 20 according to a second embodiment of the present invention. The lighting device 20 shown in FIG. 5A includes a light source 11, a transparent light conducting plate 12 having an incident surface 12a, a back surface 12b, a first light-emitting surface 12c' and a second light-emitting surface 12c", a reflection member 13 having a reflection surface, a sidewall surface 13a on a side of the light conducting plate 12 opposite to the side thereof on which the light source 11 is provided, an emission surface 14, a space 15, and a reflection mirror 16.

The light conducting plate 12 is located so that the incident light 12a faces the light source of the fluorescent tube covered by the reflection mirror 16 having a cross-section of a half-circle shape functioning to collect light emitted by the light source 11. The light conducting plate 12 has a light-emitting surface which is sloped so that the thickness of the light conducting plate 12 becomes smaller as the distance from the light source 11 increases. The above sloped light-emitting surface includes the first light-emitting surface 12c' and the second light-emitting surface 12c". The first light-emitting surface 12c' is inclined at an angle Θ1 with respect to the back surface 12b. The second light-emitting surface 12c" is inclined at an angle Θ2, which is greater than the angle Θ1. Further, an interface between the first light-emitting surface 12c' and the second light-emitting surface 12c" is rounded so that the interface is curved. The reflection surface 13 faces the back surface 12b of the light conducting plate 12. The sidewall surface 13a is provided on the side of the light conducting plate 12 opposite to the side thereof on which the light source 11 is provided. The emission surface 14 is provided on the upper side of the light conducting plate 12 opposite to the lower side thereof facing the reflection surface 13. The sidewall surface 13a is spaced apart from the edge of the light conducting plate 12, and the space 15 is defined by the light-emitting surfaces 12c' and 12c", the sidewall surface 13a and the emission surface 14.

With the structure in which the slant angle Θ2 is greater than the slant angle Θ1, it becomes possible to prevent the emitted light from being collected at the edge portion of the light conducting plate 12 and to appropriately distribute emission of light. Hence, it becomes possible to more efficiently utilize the light and make the even luminance distribution. Further, the rounded end of the light conducting plate 12 forming the second light-emitting surface 12c" can be formed more easily than a sharp end thereof. Furthermore, the rounded end is not likely to be broken. For the above reasons, the yield can be improved.

Figure 5B:
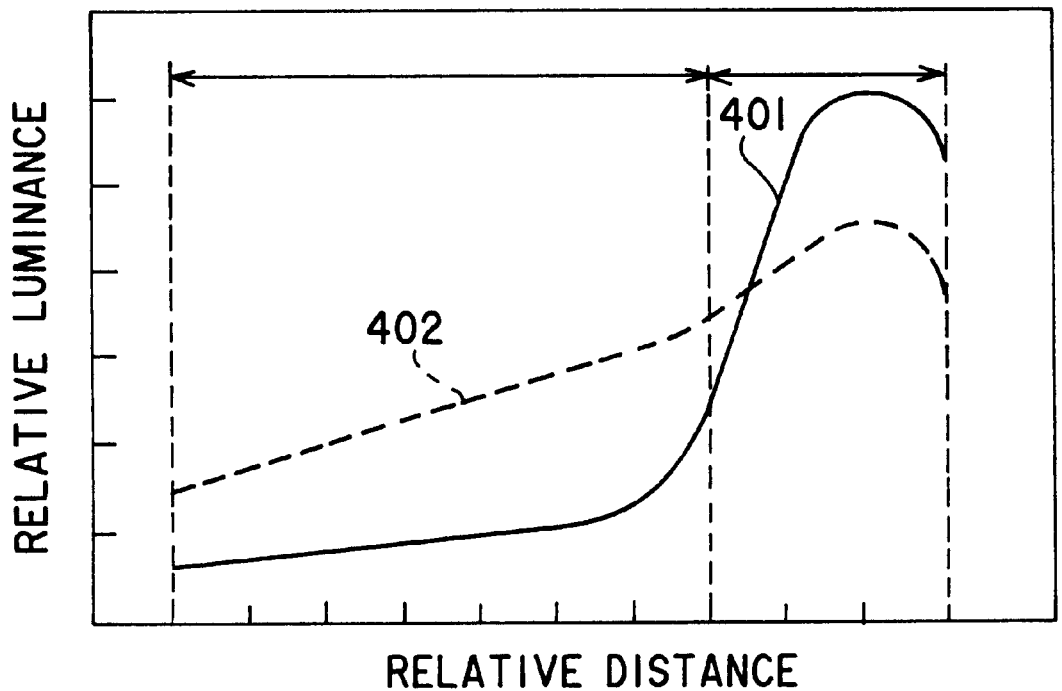
FIG. 5B is a graph of a luminance characteristic of the lighting device shown in FIG. 5A.

FIG. 5B is a graph showing a luminance distribution as a function of the angle Θ1 with the angle Θ2 kept constant (Θ2>Θ1). A solid line 401 relates to a case where the angle Θ1 is relatively small, and a solid line 402 relates to a case where the angle Θ2 is relatively large. As shown in FIG. 5B, a small amount of light is emitted from the first light-emitting surface 12c' and is propagated toward the edge of the light conducting plate 12 when the angle Θ1 is relatively small. Hence, a large mount of light is emitted from the edge portion of the light conducting plate 12, and hence a large amount of luminance is obtained around the edge portion. When the angle Θ1 is relative large, the amount of light emitted from the first light-emitting surface 12c' is increased, while the amount of light emitted from the second light-emitting surface 12c" is decreased. Hence, the even luminance distribution can be obtained. However, the luminance distribution on the tip-end side is increased or decreased in proportion to the angle Θ1.

The reflection surface 13 can be a diffusion surface or a mirror surface. When the reflection surface 13 is a diffusion surface, the light emitted from the back surface 13b of the light conducting plate 12 is diffused, whereby the amount of light emitted from the vicinity of the light source 11 is increased and the luminance distribution is further leveled.

Figure 6A:
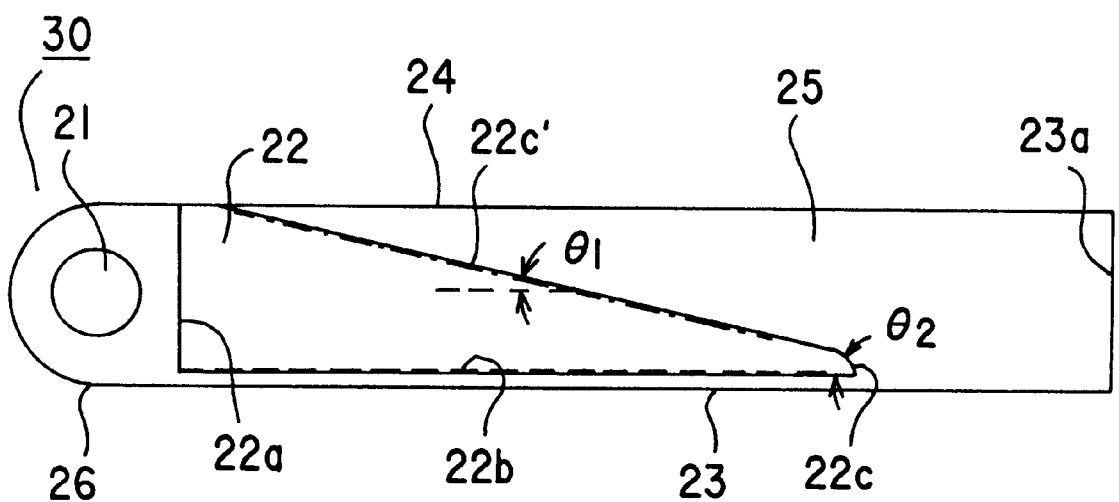
FIG. 6A is a cross-sectional view of a lighting device according to a third embodiment of the present invention.

FIG. 6A is a diagram of a lighting device 30 according to a third embodiment of the present invention. The lighting device 30 shown in FIG. 6A includes a light source 21 formed with, for example, a fluorescent tube, a transparent light conducting plate 22 having an incident surface 22a, a back surface 22b, a first light-emitting surface 22c' and a second light-emitting surface 22c", a reflection member 23 having a reflection surface, a sidewall surface 23a on a side of the light conducting plate 22 opposite to the side thereof on which the light source 21 is provided, an emission surface 24, a space 25, and a reflection mirror 26.

The light conducting plate 22 shown in FIG. 6A differs from the light conducting plate 12 shown in FIG. 5A in that the first light-emitting surface 22c' is a plane with shaped distribution portions and a diffusion reflection pattern is printed on the back surface 22b. The shaped distribution portions are convex and concave portions formed on the surface of the first light-emitting surface 22c'. The diffusion reflection pattern is painted with white paint. The shaped distribution portions and the diffusion reflection pattern contribute to make the even luminance distribution.

Alternatively, it is possible to form a diffusion reflection pattern on the first light-emitting and provide the back surface 22b with shaped distribution portions. Further, it is possible to weight the density of diffusion reflection pattern taking into account the luminance distribution. For example, the sizes of the patterned areas are weighted. However, such weighting may be not needed when the lighting device is of a relatively small size and the slant angle Θ1 is relatively great.

Figure 6B:
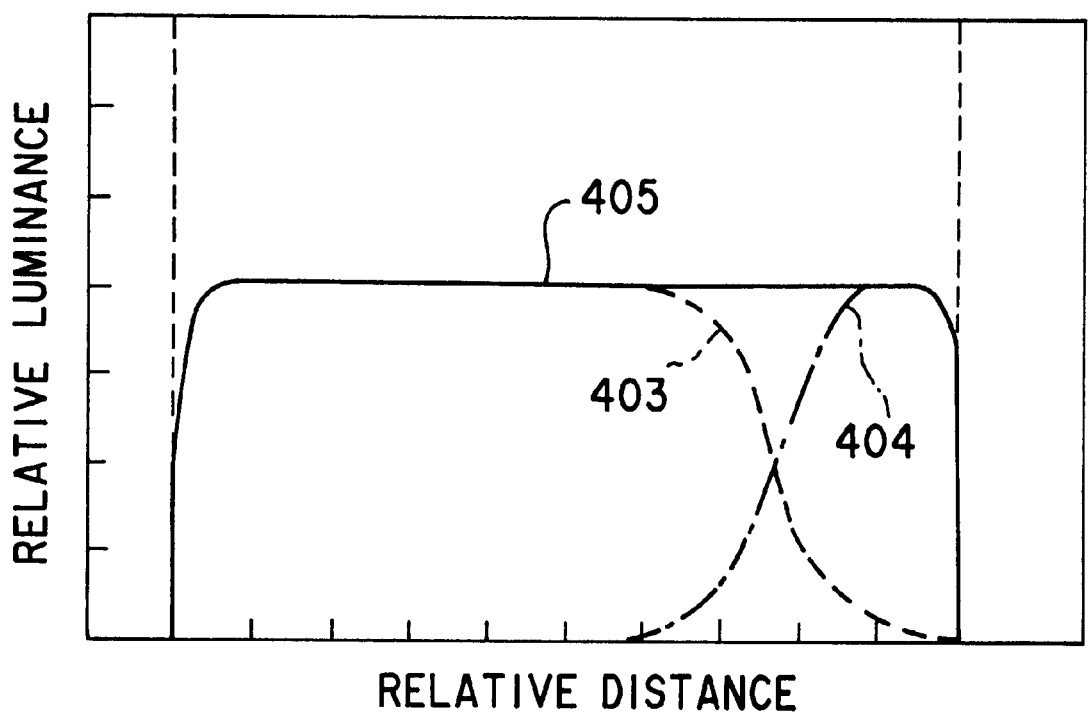
FIG. 6B is a graph of a luminance characteristic of the lighting device shown in FIG. 6A.

FIG. 6B is a graph of a luminance distribution obtained when a weighted diffusion reflection pattern is printed on the back surface 22b of the light conducting plate 22. A broken line 403 indicates the luminance distribution made by light emitted from the first light-emitting surface 22c', and a one-dot chained line 404 indicates the luminance distribution made by light emitted from the second light-emitting surface 22c". Further, a solid line 405 indicates the whole luminance distribution. It can be seen from FIG. 6B that weighted diffusion reflection pattern formed on the back surface 22b contributes to making the luminance distribution even. Hence, it can be said that the lighting device shown in FIG. 6A efficiently utilizes light and has an even luminance distribution.

Figure 7:
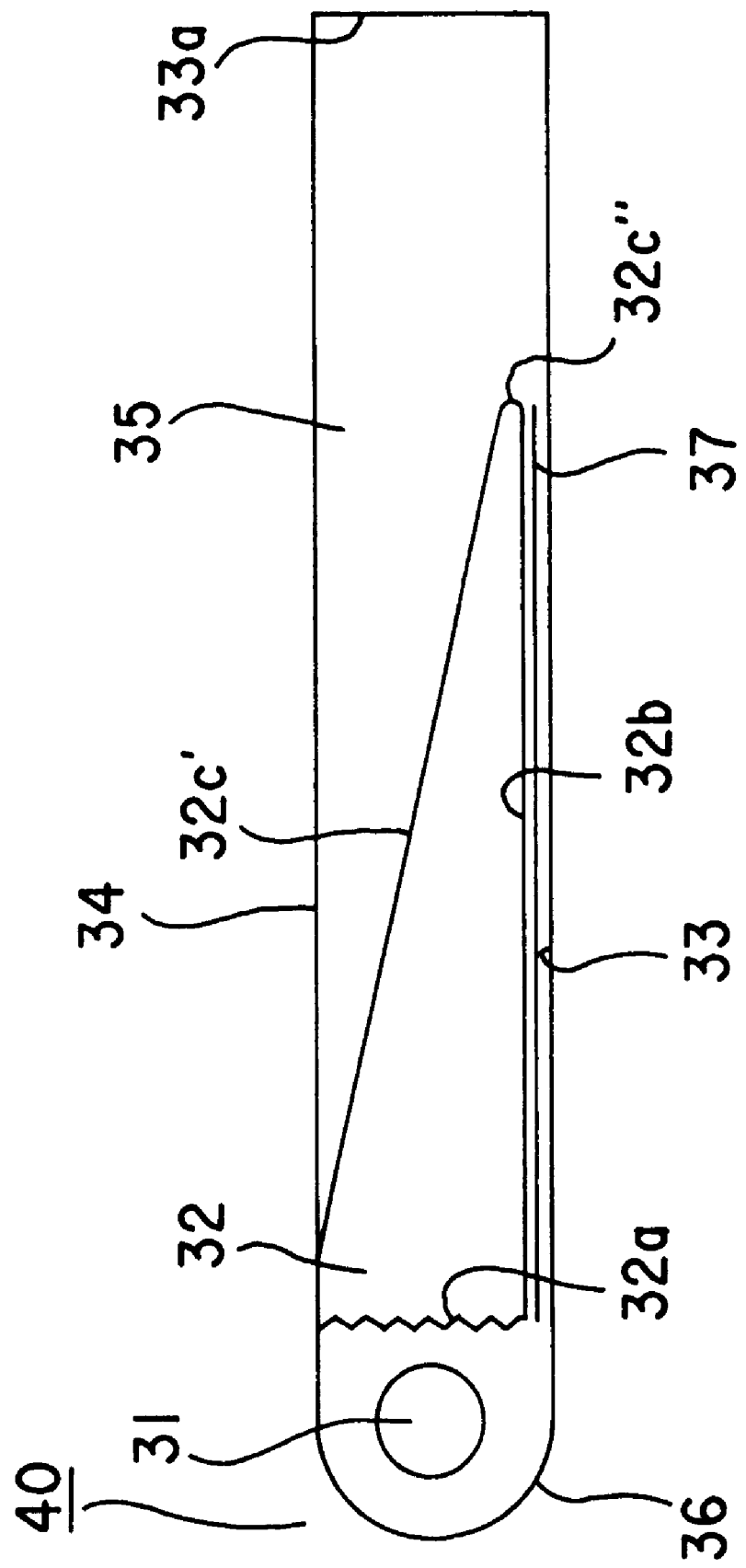
FIG. 7 is a cross-sectional view of a lighting device according to a fourth embodiment of the present invention.

FIG. 7 is a diagram of a lighting device 40 according to a fourth embodiment of the present invention. The lighting device 40 shown in FIG. 7 includes a light source 31 formed with, for example, a fluorescent tube, a transparent light conducting plate 32 having an incident surface 32a, a back surface 32b, a first light-emitting surface 32c' and a second light-emitting surface 32c", a reflection member 33 having a reflection surface, a sidewall surface 33a on a side of the light conducting plate 32 opposite to the side thereof on which the light source 31 is provided, an emission surface 34, a space 35, and a reflection mirror 36.

The shape of the light conducting plate 32 used in the fourth embodiment of the present invention differs from the previously described light conducting plates 12 and 22. The incident surface 32a includes a wavy surface having convex and concave portions. The axis of the wavy surface is parallel to the light source 31. Further, a transparent diffusion reflection sheet 37 on which a diffusion reflection pattern is printed is provided between the back surface 32b of the light conducting plate 32 and the reflection surface 33.

The fourth embodiment of the present invention is suitable for a relatively compact back-lighting device. The wavy surface which includes concave and convex portions formed on the incident light 32a and is parallel to the light source 31. Hence, the direction in which the light entering into the light conducting plate 32 via the incident surface 32a is propagated can be set to be equal to or greater than ±42° with respect to the normal line on the incident surface 32a perpendicular to the back surface 32b. Hence, it becomes possible to increase the amount of light obtained in the vicinity of the light source 31. Further, the diffusion reflection sheet 37 provided between the back surface 32b and the reflection surface 33 functions to provide an even luminance distribution.

Figure 8A:
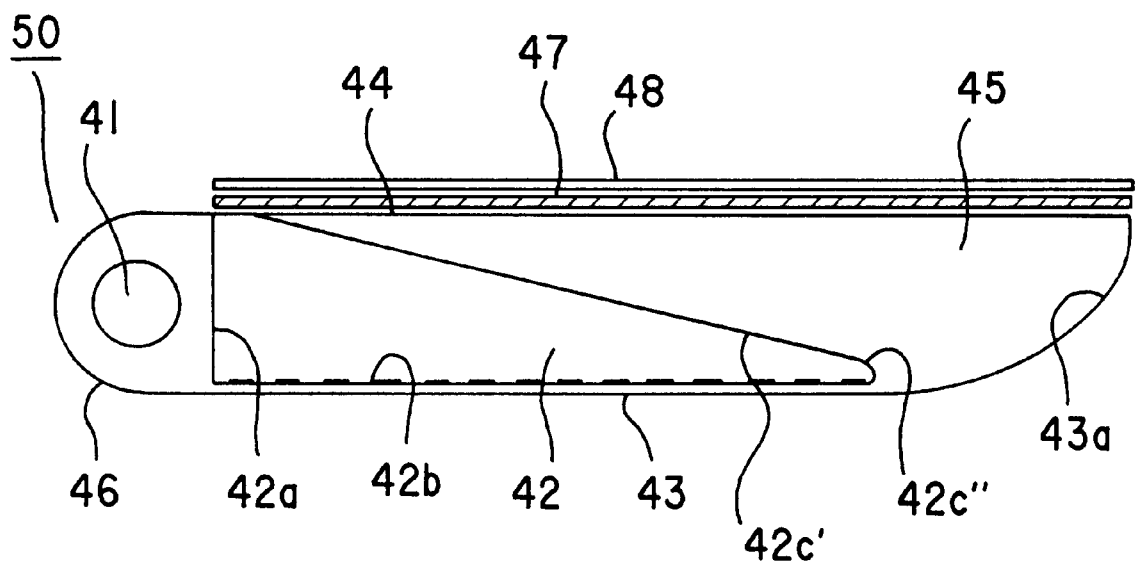
FIG. 8A is a cross-sectional view of a lighting device according to a fifth embodiment of the present invention.

FIG. 8A is a diagram of a lighting device 50 according to a fifth embodiment of the present invention. The lighting device 50 shown in FIG. 8A includes a light source 41 formed with, for example, a fluorescent tube, a transparent light conducting plate 42 having an incident surface 42a, a back surface 42b, a first light-emitting surface 42c' and a second light-emitting surface 42c", a reflection member 43 having a reflection surface, a sidewall surface 43a on a side of the light conducting plate 42 opposite to the side thereof on which the light source 41 is provided, an emission surface 44, a space 45, a reflection mirror 46, a linear prism plate 47 and a diffusion sheet 48.

Figure 8B:
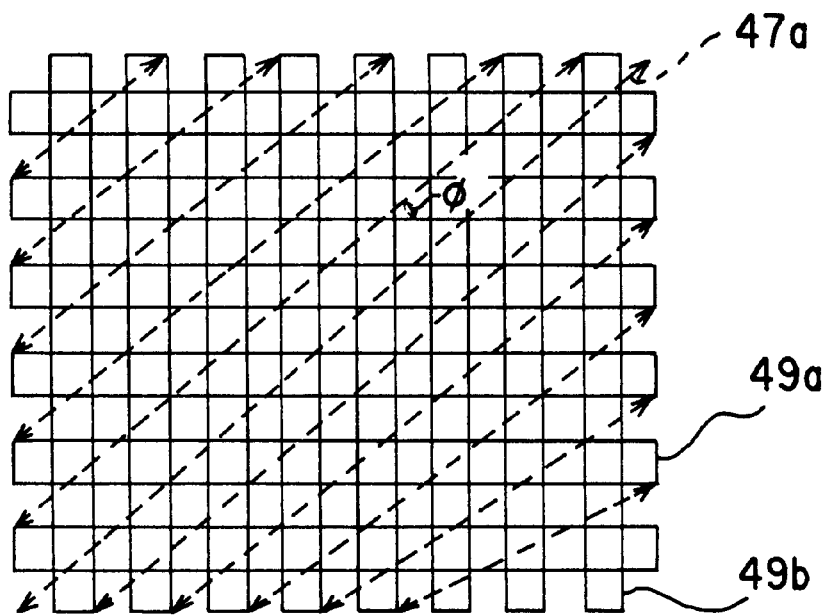
FIG. 8B is a plan view showing the positional relationship between a linear prism plate shown in FIG. 8A and electrodes of a liquid crystal display device.

The shape of the sidewall surface 43a differs from those of the sidewall surfaces 13a, 23a and 33a in that the sidewall surface 43 is a continuous curved surface extending from the reflection surface 43. A weighted deflection pattern is printed on the back surface 32b of the light conducting plate 32. The linear prism plate 47 is provided on the emission surface 44 in order to provide a directional emission in the normal line direction. Further, as shown in FIG. 8B, the linear prism plate 47 is disposed so that the axis 47a thereof and the axes of a matrix arrangement of electrodes 49a and 49b of a display device placed over the linear prism plate 47 are neither parallel to nor orthogonal to each other. The diffusion sheet used to prevent the diffusion sheet 48 printed on the back surface 42b from being seen from the outside of the lighting device is provided above the linear prism plate 47.

The curved sidewall surface 43a contributes to reducing loss of light emitted from the light conducting plate 42 whereby light can be efficiently utilized and a uniform luminance distribution can be obtained. Further, as shown in FIG. 8B, the linear prism plate 47 is arranged at an angle $\phi$ ($0° < \phi < 90°$) with respect to the electrodes 49a and 49b. With this arrangement, it is possible to prevent degradation of the display quantity due to interference.

Figure 9A:
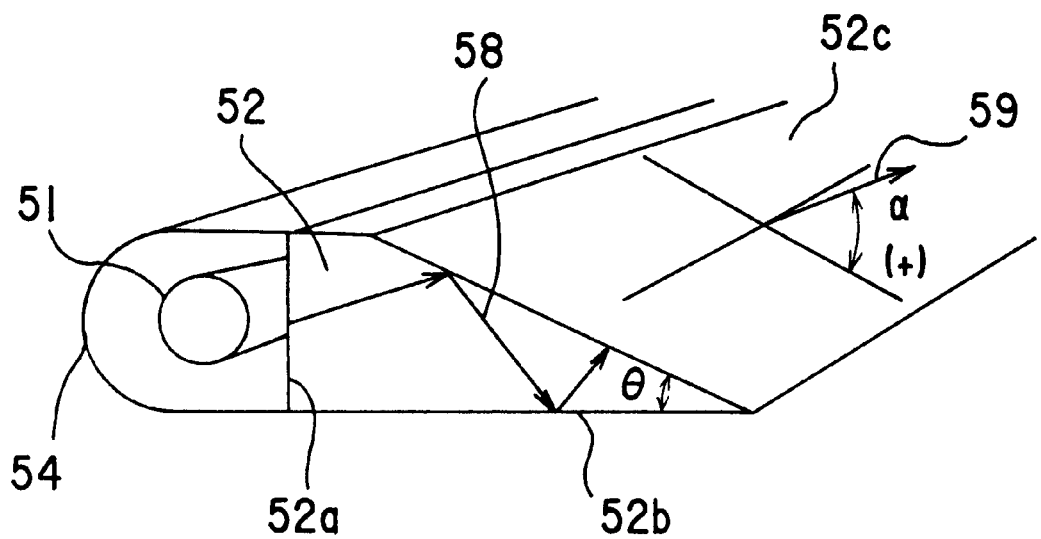
FIG. 9A is a perspective view for explaining the directivity of a first lighting device.
Figure 9B:
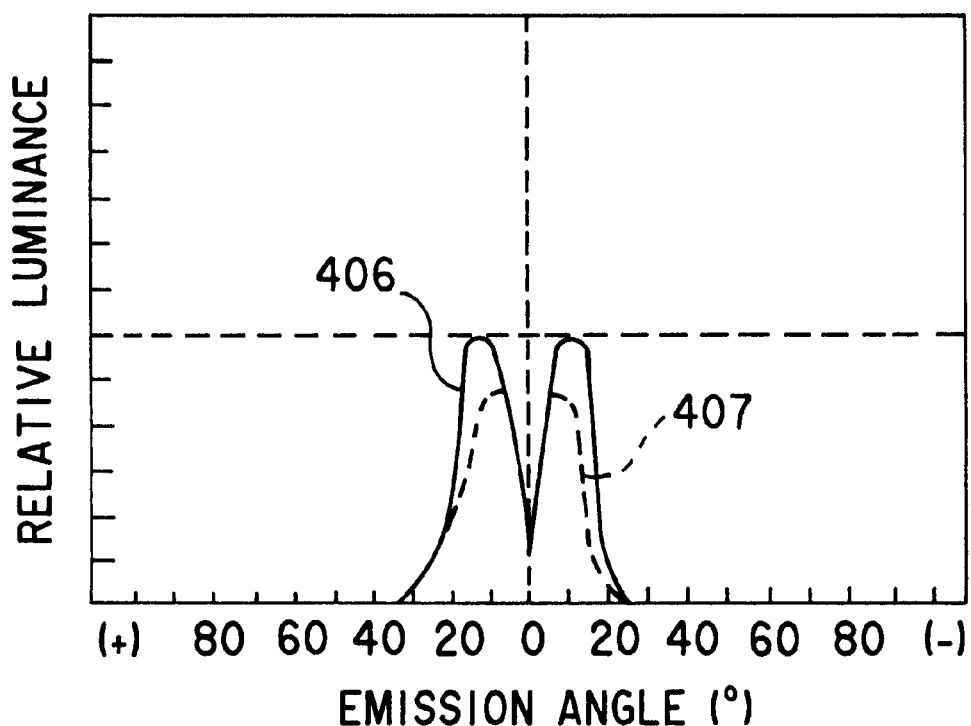
FIG. 9B is a graph of the directivity of the first lighting device shown in FIG. 9A.

FIG. 9A is a perspective view of a first lighting device, and FIG. 9B is a graph of the directivity thereof.

The lighting device shown in FIG. 9A includes a light source 51 formed with, for example, a fluorescent tube, a transparent light conducting plate 52 having an incident surface 52a, a back surface 52b and a light-emitting surface 52c, and a reflection mirror 54. The light-emitting surface 52c is inclined at an angle $\Theta$ of 10° with respect to the back surface 52b. The reflection mirror 54 is provided so as to cover the light source 51. A light emitted from the light source 51 is propagated through the light conducting plate 52, as indicated by reference number 58. A reference number 59 indicates light emitted from the light-emitting surface 59c. It will be noted that the structure shown in FIG. 9A does not employ a reflection surface or the like.

FIG. 9B shows the directivity distribution characteristics around the edge of the light conducting plate 52 and the light source 51. The vertical axis denotes a relative luminance, and the horizontal axis denotes the angle $\alpha$ of emission of light. A solid line 406 indicates the directivity characteristic around the tip-end, and a broken line 407 indicates the directivity characteristic around the light source. As shown in FIG. 9B, there is little difference between the width of the directivity peak of the directivity characteristic curve related to the edge and that related to the light source 54 when the reflection surface is not provided. However, the amount of luminance obtained on the light source side is less than that obtained on the edge side, and the directivity on the light source side has an angle less than that on the edge side. It will be noted that the luminance peak shown in FIG. 9B is the reference of the relative luminance in graphs shown in FIGS. 10B, 11B, 12B and 13B.

Figure 10A:
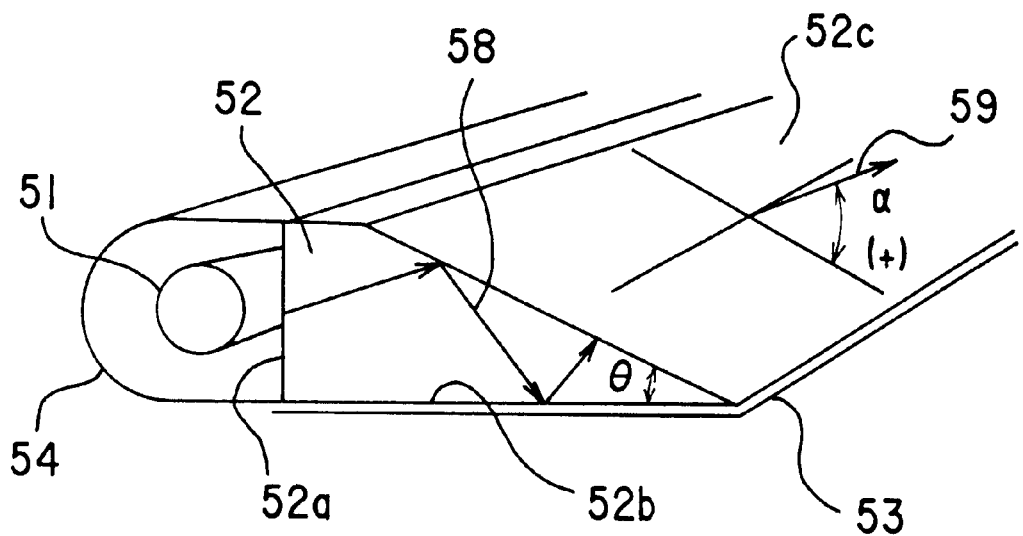
FIG. 10A is a perspective view for explaining the directivity of a second lighting device.
Figure 10B:
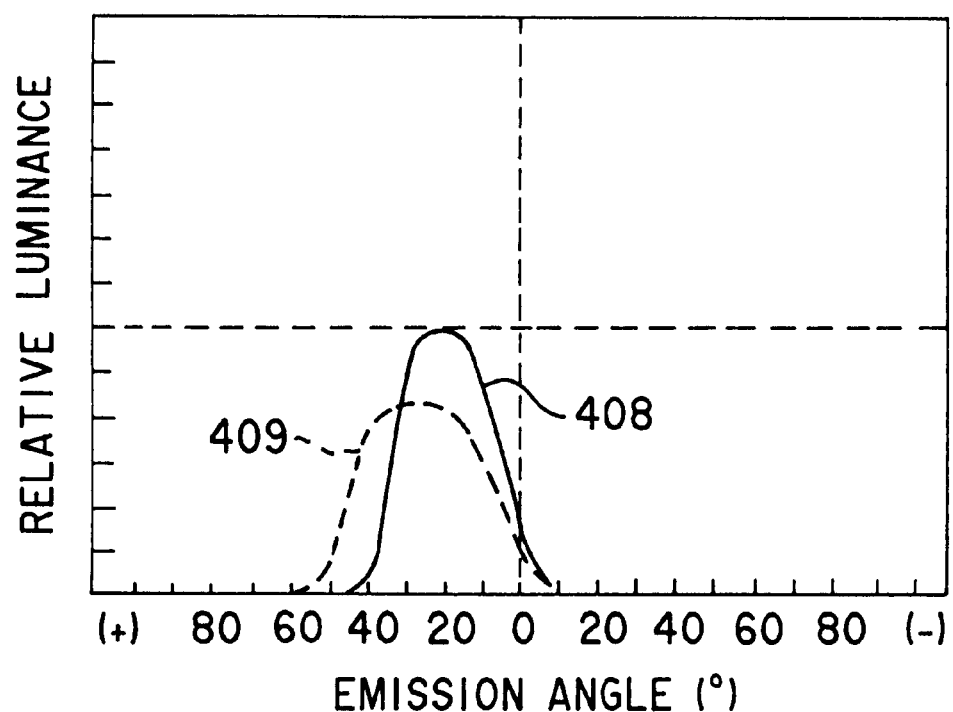
FIG. 10B is a graph of the directivity of the second lighting device shown in FIG. 10A.

FIG. 10A is a perspective view of a second lighting device, and FIG. 10B is a graph of the directivity thereof. In FIG. 10A, parts that are the same as those shown in FIG. 9A are given the same reference numbers. A reflection member 53 having a reflection surface is provided below the light conducting plate 52 so as to face the back surface 52b. The angle $\Theta$ is set to 10°. The lighting device shown in FIG. 10A is made up of the fluorescent tube 51, the reflection mirror 54, the light conducting plate 52 and the reflection surface 53.

FIG. 10B shows two directivity distribution characteristics respectively obtained when the reflection surface 53 is a mirror surface and a diffusion reflection surface. A solid line 408 indicates the directivity characteristic obtained when the reflection surface 53 is a mirror surface, and a broken line 409 indicates the directivity characteristic obtained when the reflection surface 53 is a diffusion reflection surface. As shown in FIG. 10B, the directivity peak of the directivity distribution curve 409 is almost the same as that obtained when no reflection surface is provided. However, the width of the directivity peaks are quite different. This is because light is emitted from the back surface 52b of the light conducting plate 52 at an angle sharper than the angle $\Theta$ formed between the light-emitting surface 52c and the back surface 52b. When the reflection surface 53 is a diffusion reflection surface, as shown in the curve 409, the peak of luminance becomes lower, while the width of the peak becomes greater. This is because the emitted light 59 is distributed at portions on the light-emitting surface 52c, and the luminance distribution obtained on the emission surface can be improved.

Figure 11A:
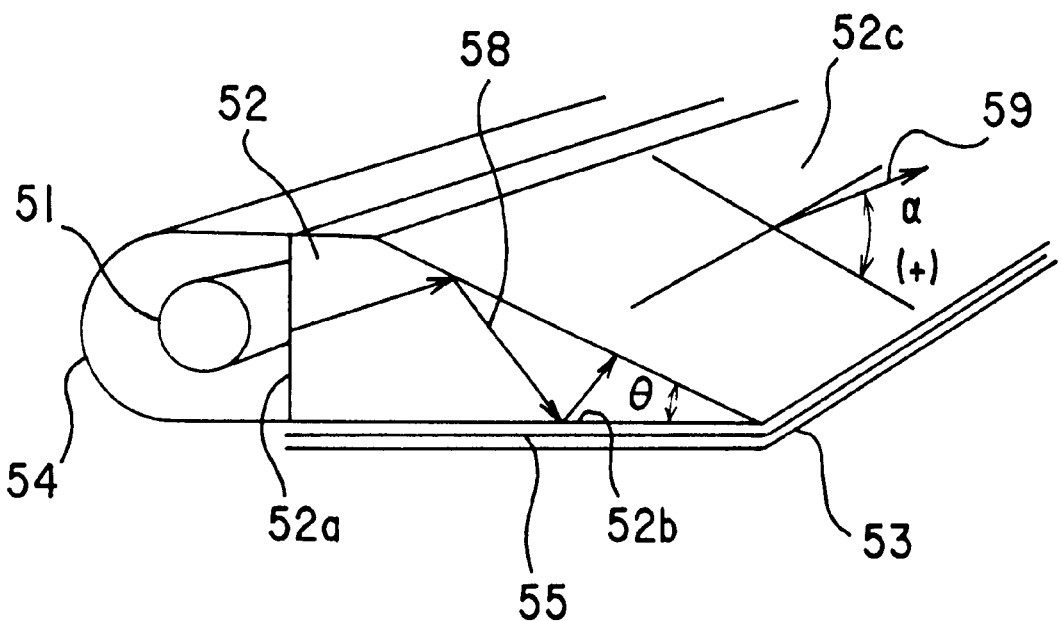
FIG. 11A is a perspective view for explaining the directivity of a third lighting device.
Figure 11B:
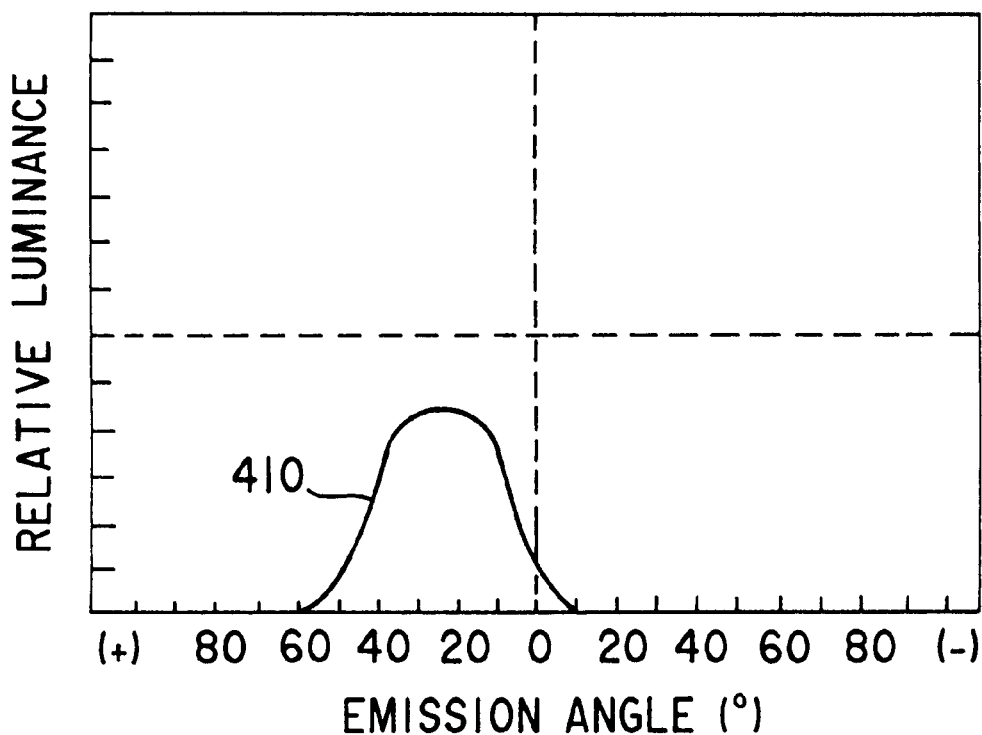
FIG. 11B is a graph of the directivity of the third lighting device shown in FIG. 11A.

FIG. 11A is a perspective view of a third lighting device, and FIG. 11B is a graph of the directivity thereof. In FIG.

11A, parts that are the same as those shown in FIG. 10A are given the same reference numbers. A transparent diffusion reflection sheet 55 is provided between the back surface 52b of the light conducting plate 52 and the reflection surface 53. A weighted diffusion reflection pattern is formed on the diffusion reflection sheet 55. The reflection surface 53 is a mirror surface. The angle Θ is set to 10°. The lighting device shown in FIG. 11A is made up of the fluorescent tube 51, the reflection mirror 54, the light conducting plate 52, the reflection member 53, and the diffusion reflection sheet 55.

FIG. 11B shows the directivity distribution characteristic of the lighting device shown in FIG. 11A equipped with the diffusion reflection sheet 55. A solid line 410 indicates the directivity characteristic of the lighting device shown in FIG. 11A. As shown in FIG. 11B, the peak luminance level is decreased as in the case of the curve 409 shown in FIG. 10B in which the reflection surface 53 is a diffusion reflection surface. Instead, the width of the directivity peak is increased, because the emitted light 59 is obtained so that the light is distributed at portions on the light-emitting surface 52c. Hence, the luminance distribution can be improved.

Figure 12A:
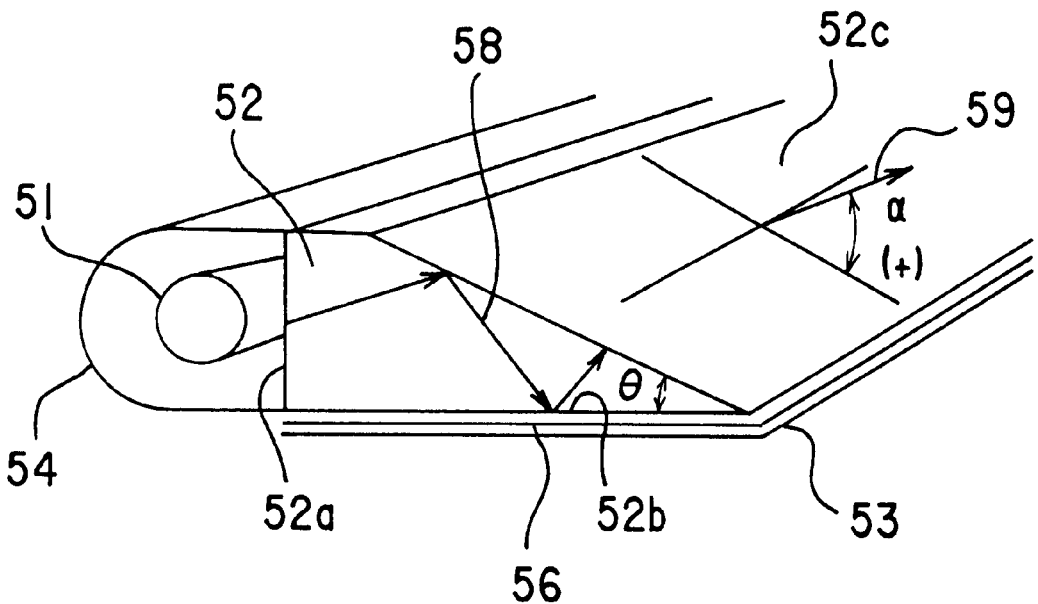
FIG. 12A is a perspective view for explaining the directivity of a fourth lighting device.

FIG. 12A is a perspective view of a fourth lighting device, and FIG. 11B is a graph of the directivity thereof. In FIG. 12A, parts that are the same as those shown in FIG. 11A are given the same reference numbers. A linear prism plate 56 is used instead of the transparent diffusion reflection sheet 55 and is provided between the back surface 52b of the light conducting plate 52 and the reflection surface 53. The surface of the linear prism plate 56 on which concave and convex portions are formed faces the light conducting plate 52 so that the axis of the prism is parallel to the longitudinal direction of the lighting device. The angle Θ is set to 10°. The lighting device shown in FIG. 12A is made up of the fluorescent tube 51, the reflection mirror 54, the light conducting plate 52, the reflection member 53, and the linear prism plate 56.

Figure 12B:
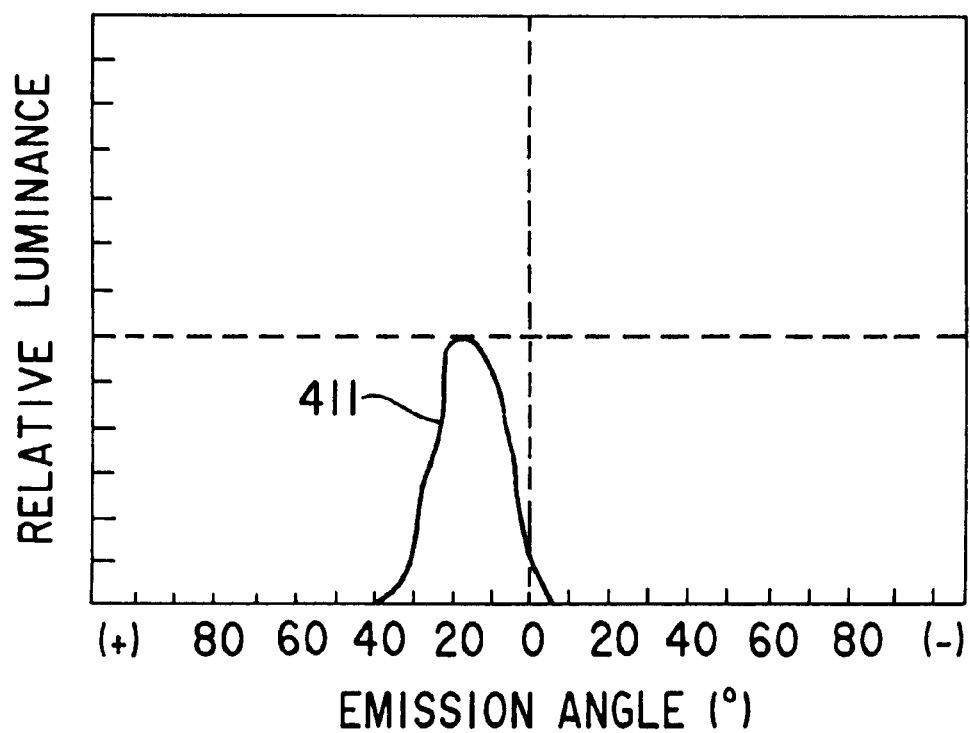
FIG. 12B is a graph of the directivity of the fourth lighting device shown in FIG. 12A.

FIG. 12B shows the directivity distribution characteristic of the lighting device shown in FIG. 12A equipped with the linear prism plate 56. A solid line 411 indicates the directivity characteristic of the lighting device shown in FIG. 12A. As shown in FIG. 12B, a high peak luminance level is obtained and the amount of emission of light around the light source 51 can be increased so that the luminance distribution can be improved.

Figure 13A:
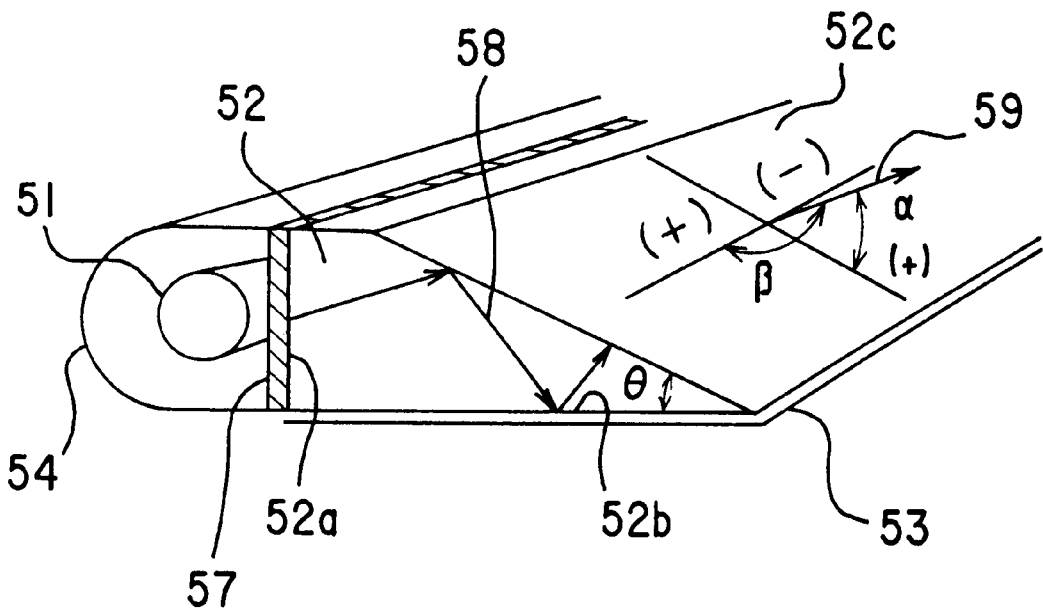
FIG. 13A is a perspective view for explaining the directivity of a fifth lighting device.
Figure 13B:
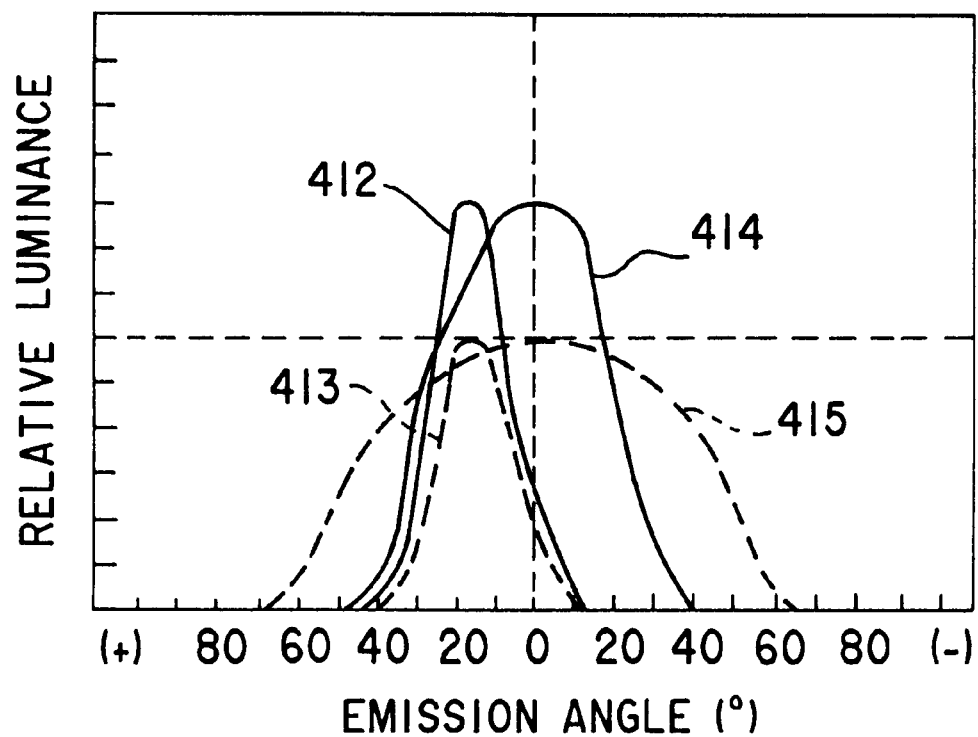
FIG. 13B is a graph of the directivity of the fifth lighting device shown in FIG. 13A.

FIG. 13A is a perspective view of a fifth lighting device, and FIG. 13B is a graph of the directivity thereof. In FIG. 13A, parts that are the same as those shown in FIG. 10A are given the same reference numbers. A linear prism plate 57 is attached to the incident surface 52a so as to face the light source 51 in such a manner that the prism axis of the plate 57 is perpendicular to the longitudinal direction of the light source 51. The angle Θ is set to 10°. The lighting device shown in FIG. 13A is made up of the fluorescent tube 51, the reflection mirror 54, the light conducting plate 52, the reflection member 53, and the linear prism plate 57.

FIG. 13B shows the directivity distribution characteristic of the lighting device shown in FIG. 13A equipped with the linear prism plate 57. A solid line 412 indicates the directivity characteristic of the lighting device shown in FIG. 13A in the up and down direction (angle α) in which the linear prism plate 57 is provided. A broken line 413 indicates the directivity characteristic of the lighting device in the up and down direction (angle α) in which the linear prism plate 57 has been removed. A solid line 414 indicates the directivity characteristic of the light device shown in FIG. 13A in the left and right directions (angle β) in which the linear prism plate 57 is provided. A broken line 415 indicates the directivity characteristic of the light device in the left and right directions (angle β) in which the linear prism plate 57 has been removed.

As shown in FIG. 13B, the linear prism plate 57 functions to sharpen the directivity in the left and right directions, as indicated by the characteristic curves 413 and 415, and to improve the luminance characteristic of the light device.

Figure 14A:
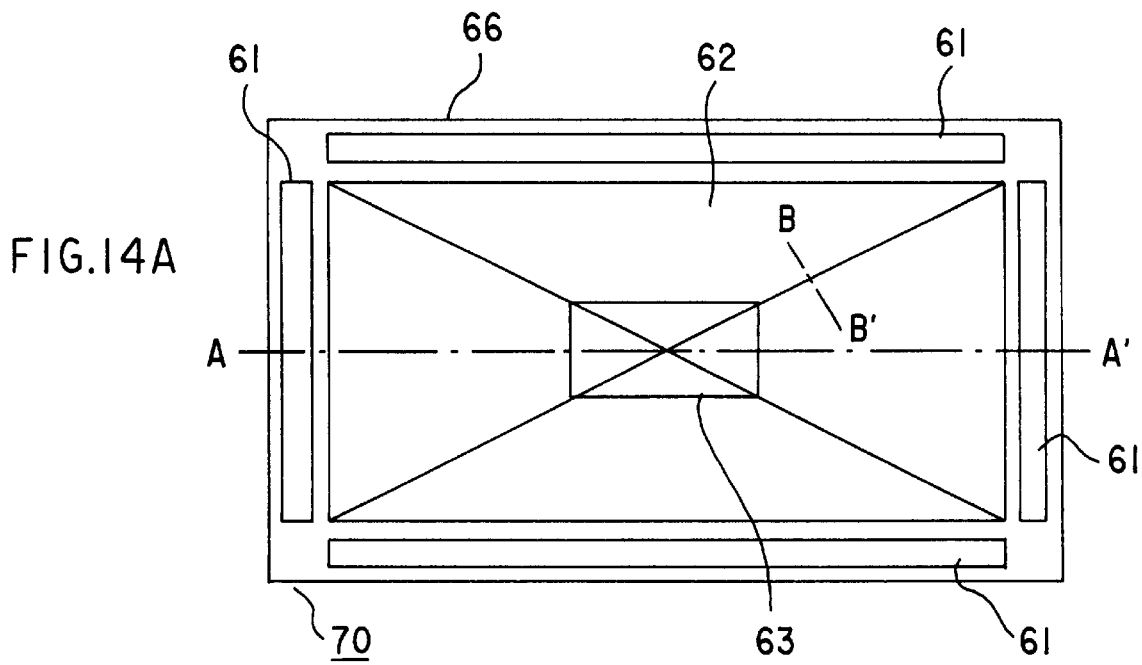
FIG. 14A is a plan view of a lighting device according to a sixth embodiment of the present invention.
Figure 14B:
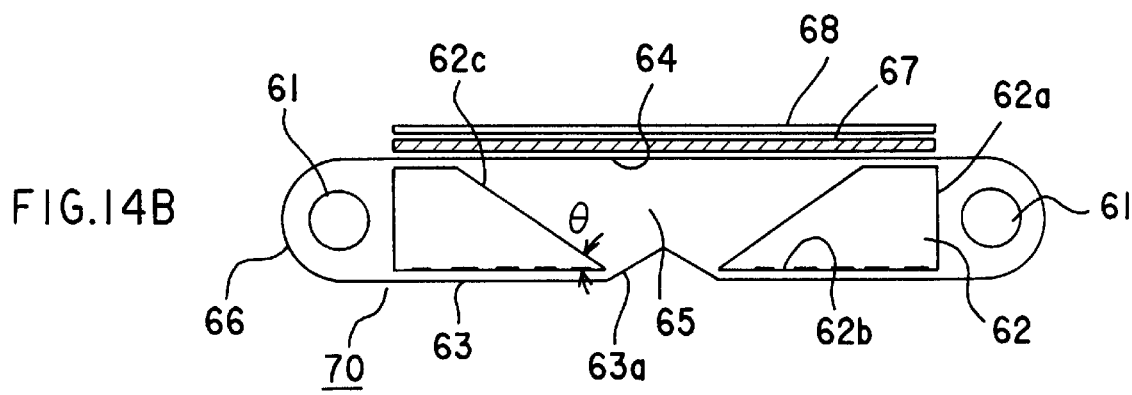
FIG. 14B is a cross-sectional view of the lighting device shown in FIG. 14A taken along line A–A'.
Figure 14C:
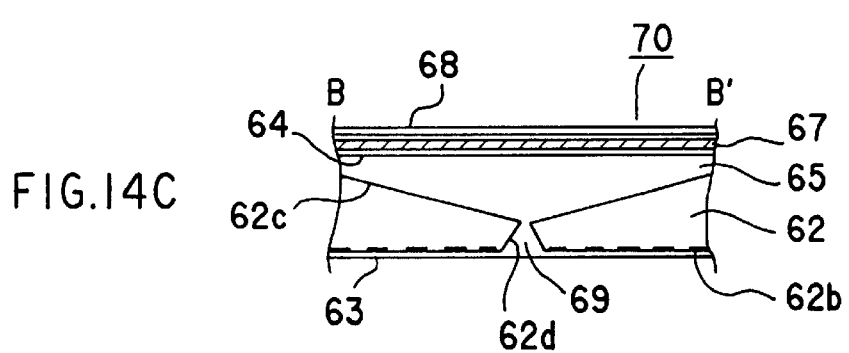
FIG. 14C is a cross-sectional view taken along line B–B7.

A description will now be given, with reference to FIGS. 14A, 14B and 14C, of a lighting device 70 according to a sixth embodiment of the present invention. FIG. 14A is a plan view of the lighting device 70 according to the sixth embodiment of the present invention, FIG. 14B is a cross-sectional view taken along line A–A' shown in FIG. 14A, and FIG. 14C is a cross-sectional view taken along line B–B' shown in FIG. 14A. The lighting device 70 includes four units, each of which includes one light source and one light conducting plate.

The lighting device 70 shown in FIGS. 14A through 14C includes four light sources 61 formed with, fluorescent tubes, four transparent light conducting plates 62, a reflection member 63 having a reflection surface, an emission surface 64, a space 65, a reflection mirror 66, a linear prism plate 67, a diffusion sheet 68, and a light interrupting portion 69.

The four units are arranged on the same plane as shown in FIGS. 14A through 14C. The units may be any of the lighting devices according to the first through fifth embodiments of the present invention. The light sources 66 are located on the four sides of the lighting device and are covered by the reflection mirror 66. The four light conducting plates 62 which are separately provided are arranged so that these plates face the corresponding light sources 61. The shape of each of the light conducting plates 62 has a slope 62 inclined toward the edge thereof at an angle Θ with respect to a back surface 62b. Further, the width of each of the light conducting plates 62 becomes narrow toward the edge. A diffusion reflection pattern weighted taking into account the luminance distributions of the light conducting plates 62 is formed on the back surface 62b of each of the light conducting plates 62.

The reflection member 63 has a convex reflection surface 63a of a quadrangular pyramid shape. The convex reflection surface 63a is located in the space 65 defined by the edges of the four light conducting plates 62. The linear prism plate 67 is provided on the emission surface 64 so that the prism axis is neither parallel to nor orthogonal to the axes of the matrix arrangement of electrodes of a display device located above the linear prism plate 67. The diffusion sheet 68 is used to prevent the diffusion reflection pattern printed on the back surface 62b from being seen from the outside of the lighting device.

As shown in FIG. 14C, the light conducting plates 62 are separated from and spaced apart from each other in order to prevent rays propagated through the plates 62 from returning toward the light sources 61. The space formed between the adjacent the plates 62 functions as the light interrupting space. A reflection side surface 62d is formed in each of the light conducting plates 62 and prevents light from being emitted from the side surfaces of the light conducting plates 62. The reflection side surfaces 62 are inclined as shown in FIG. 14C so that light reflected thereby is oriented toward the emission surface 64.

The lighting device 70 according to the sixth embodiment of the present invention is suitable for a large-scale lighting device required to provide a large amount of luminance. By arranging a plurality of units (which can be any of the lighting devices according to the first through fifth embodiments of the present invention), it is possible to efficiently utilize light and provide an even high-luminance distribution.

It may be possible to use a single light conducting plate having portions corresponding to the light conducting plates 62. However, a lighting device having such a single light conducting plate will not provide a luminance as high as that of the lighting device shown in FIGS. 14A through 14C.

Further, it is possible to use an arbitrary number of units rather than four units. For example, two units which are located on the same plane and face each other can be used. Further, instead of the diffusion reflection patterns printed on the back surfaces of the light conducting plates 62, it is possible to employ other means for leveling the luminance distribution, as shown in FIG. 5A through FIG. 13.

Figure 15:
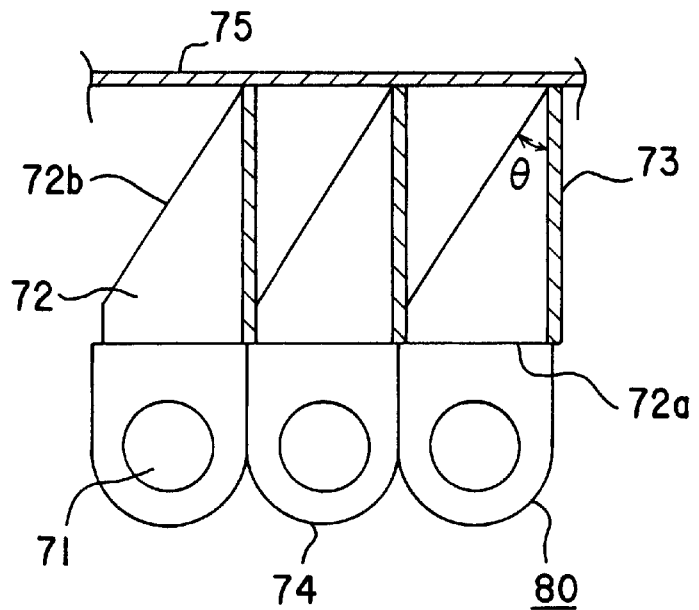
FIG. 15 is a cross-sectional view of a lighting device according to a seventh embodiment of the present invention.

FIG. 15 is a partially cross-sectional side view of a lighting device 80 according to a seventh embodiment of the present invention. The lighting device 80 includes a plurality of light sources 71 formed with, for example, fluorescent tubes, a plurality of light conducting plates 72 having incident surfaces 72a and light-emitting surfaces 72b, a plurality of reflection members 73 having reflection surfaces, a plurality of reflection mirrors 73, and a diffusion sheet 75.

The lighting device 80 includes a plurality of units, each having one light source 71, one light conducting plate 72 and one reflection member 73. Each of the units may be any of the lighting devices used in the first through fifth embodiments of the present invention. The units are arranged side by side so that the light-emitting surfaces 72b of the light conducting plates 72 face upward. The side surface of each of the light conducting plates 72 are adjacent to the reflection members 73. The angle Θ formed by each light-emitting surface 72b and each reflection member 73 is, for example, 30°. The light conducting plates 72 are made of a transparent member such as an acrylic resin. The diffusion sheet 75 functions to provide a uniform luminance distribution and prevent the reflection members 73 from being seen from the outside of the lighting device 80. Light emitted from the light-emitting surface 72b of one unit except for light directly reaching the diffusion sheet 75 is reflected by the reflection surface 73 of the adjacent unit, and is oriented to the diffusion sheet 75.

The lighting device 80 according to the seventh embodiment of the present invention is suitable for a large-scale lighting device required to provide high luminance. The arrangement of units shown in FIG. 15 makes it possible to provide an even luminance characteristic, a sharp directivity and high efficiently in use of light.

Figure 16:
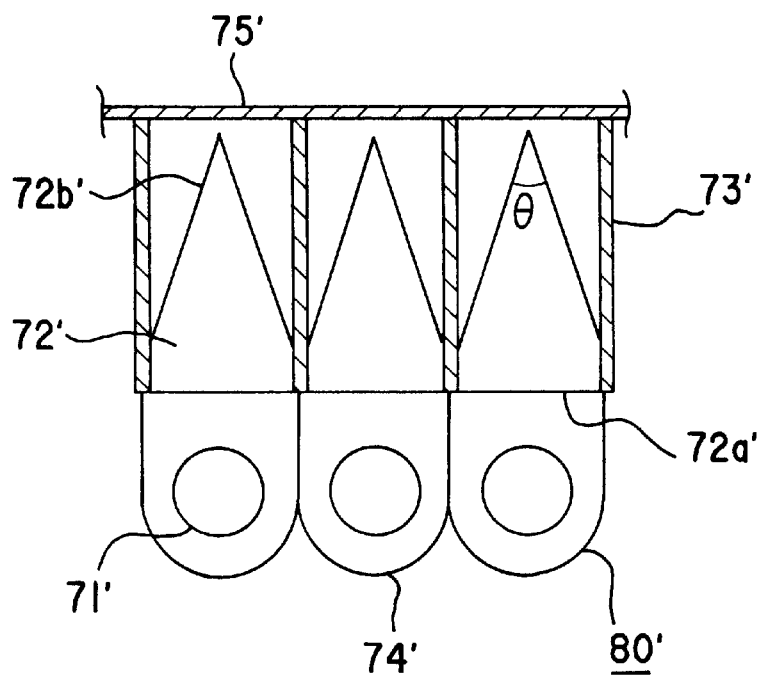
FIG. 16 is a cross-sectional view of a lighting device according to an eighth embodiment of the present invention.

FIG. 16 is a partially cross-sectional side view of a lighting device 80' according to an eighth embodiment of the present invention. The lighting device 80' includes a plurality of light sources 71' formed with, for example, fluorescent tubes, a plurality of light conducting plates 72' having incident surfaces 72a' and light-emitting surfaces 72b', a plurality of reflection members 73' having reflection surfaces, a plurality of reflection mirrors 73', and a diffusion sheet 75'. The shape of the light conducting plates 72' differs from that of the light conducting plates 72 shown in FIG. 15 in which the light conducting plates 72' have a cross section of an approximately equilateral triangle. The light conducting plates 72' are arranged side by side via the reflection members 73' so that the apexes thereof face upward. Two surfaces forming the apex of each of the light conducting plates 72' function as light-emitting surfaces 72b'. The angle of each apex is, for example, 30°.

The lighting device 80' has a directivity sharper than that of the lighting device 80, and utilizes light more efficiently.

Figure 17:
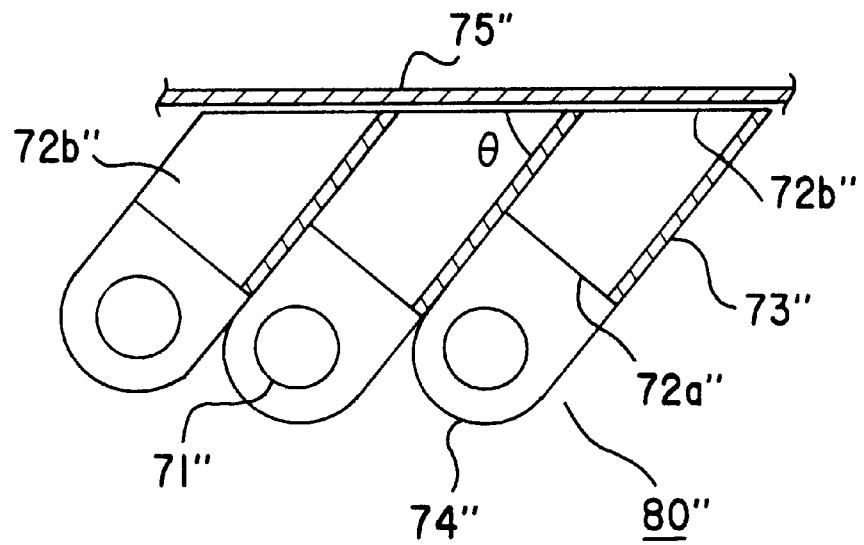
FIG. 17 is a cross-sectional view of a lighting device according to a ninth embodiment of the present invention.

FIG. 17 is a partially cross-sectional side view of a lighting device 80'' according to a ninth embodiment of the present invention. The lighting device 80'' includes a plurality of light sources 71'' formed with, for example, fluorescent tubes, a plurality of light conducting plates 72'', a plurality of reflection members 73'' having reflection surfaces, a plurality of reflection mirrors 73'', and a diffusion sheet 75''. The shape of the light conducting plates 72'' is almost the same as that of the light conducting plates 72. However, the arrangement of the plates 72'' is different from that of the plates 72. The light conducting plates 72'' having incident surfaces 72a'' are obliquely arranged side by side and stacked so that the side surfaces 72b'' thereof are adjacent to the reflection surfaces 73'' associated with the neighboring light conducting plates 72''. The side surfaces 72b'' of the light conducting plates 72'' function as light-emitting surfaces. The angle of each apex is, for example, 30°. The lighting device shown in FIG. 17 can be made to be thinner than that of the lighting devices shown in FIGS. 15 and 16.

A description will now be given, with reference to FIGS. 18 and 19, of a lighting device 100 according to a tenth embodiment of the present invention. The lighting device 100 corresponds to an improvement in the lighting device 70 shown in FIGS. 14A, 14B and 14C. The lighting device 100 differs from the lighting device 70 in the structure of a diffusion pattern 101 and use of a special linear prism plate 102.

More particularly, the lighting device 100 includes two light sources 105 formed with, for example, fluorescent tubes, two light conducting plates 106, a reflection member 107 having a reflection surface, the special linear prism plate 102, reflection mirrors 108, a normal linear prism plate 110, and a diffusion sheet 116.

Each of the two light conducting plates 106 has an incident surface 106a, a back surface 106b a light-emitting surface 106c, and an edge 106d. The thickness t of each of the light conducting plates 106 becomes smaller as the distance from the associated light source increases. The light-emitting surface 106c is inclined at an angle Θ with respect to the back surface 106b. Each of the two light conducting plates 106 has a wedge shape and has a cross section of an approximately right-angled triangle. The reflection member 107 is provided below the two light conducting plates 106. The reflection mirrors 108 cover the associated light sources 105, as shown in FIG. 18. The cross section of the reflection mirror may be of a half-cycle shape instead of the cross section shown in FIG. 18.

The two light conducting plates 106 are separated apart from each other so that the light-emitting surfaces 106c thereof face each other. With this arrangement of the plates 106, a space 109 is defined between and above the light-emitting surfaces 106c. The normal linear prism plate 110 is provided above the light conducting plates 106 so that a space 109 is formed between the linear prism plate 110 and the plates 106.

Figure 20:
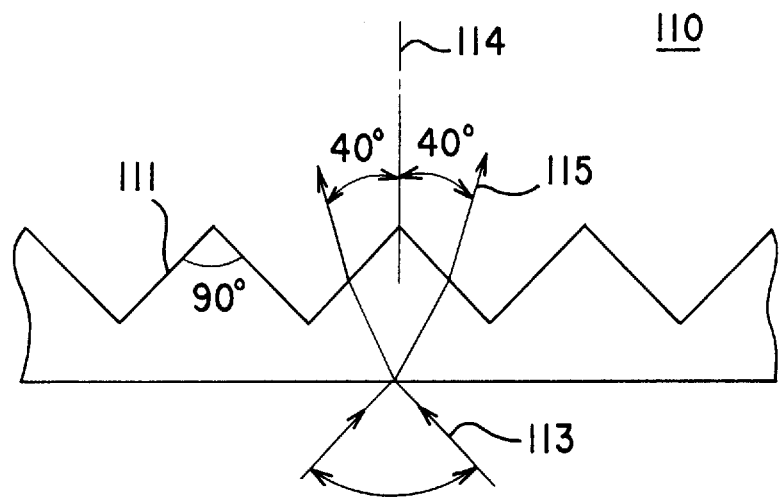
FIG. 20 is a cross-sectional view of a normal linear prism plate used in the lighting device shown in FIG. 18.

As shown in FIG. 19, the normal linear prism plate 110 has a plurality of linear prisms 111, each having a vertical angle of 90°. The linear prisms are arranged side by side and inclined at an angle a with respect to the direction (indicated by a reference number 112) orthogonal to the longitudinal direction of the light sources 105. As shown in FIG. 20, the linear prism plate 100 functions to collect incident light beams 113 entering within a wide angle range toward a normal line 114 of the linear prism plate 110. The degree of collection is equal to, for example, 40° as shown in FIG. 20.

It will be noted that the two lighting units shown in FIG. 19 can be replaced by any of the embodiments described in the specification.

Turning again to FIG. 18, the diffusion sheet 116 is located above the normal linear prism plate 110 and diffuses light from the normal linear prism plate 110. The upper surface of the diffusion sheet 116 serves as an emission surface 117 of the lighting device 100.

A description will now be given of the above-mentioned two essential features of the lighting device 100. First of all, the diffusion pattern 101 will be described below.

Figure 21:
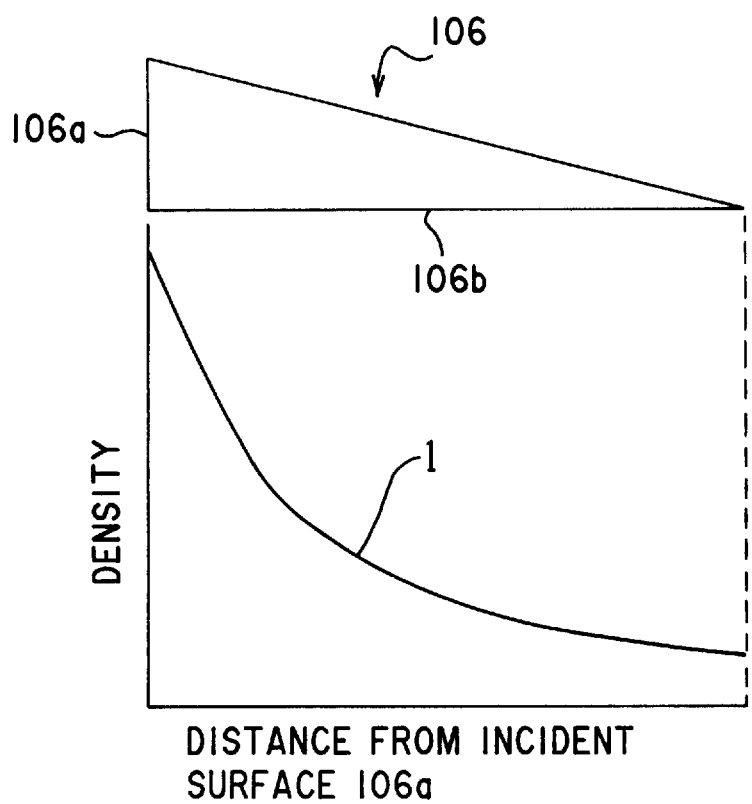
FIG. 21 is a diagram for explaining a diffusion pattern formed on the back surface of a light conducting plate used in the lighting device shown in FIG. 18.

The diffusion pattern 101 includes white ink parts 120 (FIG. 18) formed on the back surface 106b of each of the light conducting plates 106. The white ink parts 120 are arranged so as to form a predetermined pattern. Light entering into the white ink parts 102 is diffused. As indicated by a curve I shown in FIG. 21, the white ink parts 102 are arranged on the back surface 106b with a high density in the vicinity of the incident surface 106a. That is, each of the white ink parts 102 located in the vicinity of the incident surface 106a is weighted so as to have a relatively large area. The diffusion pattern 101 having the above white ink parts 102 functions to diffuse much light particularly, in the vicinity of the incident surface 106a.

Figure 22:
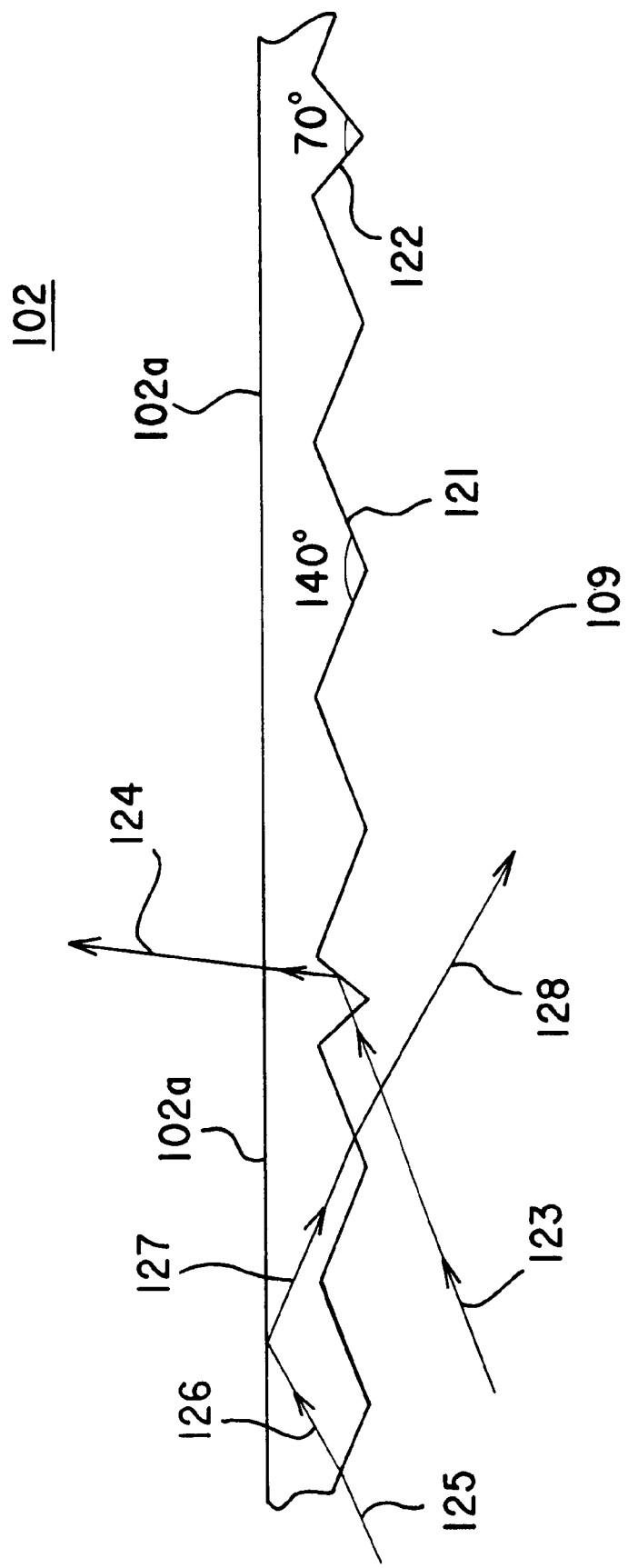
FIG. 22 is a cross-sectional view of a structure of a special linear prism plate used in the lighting device shown in FIG. 18.

The special linear prism plate 102 will be described below. FIG. 22 is a cross-sectional view of the special linear prism plate 102. As shown in FIG. 22, the special linear prism plate 102 includes first linear prisms 121 having a vertical angle of 140° and second linear prisms 122 having a vertical angle of 70°. Each of the first linear prisms 121 has a cross section of an approximately equilateral triangle shape, and each of the second linear prisms 122 also has a cross section of an approximately equilateral triangle shape. The ratio of the number of first prisms 121 to the number of second prisms 122 is 3:1.

Figure 18:
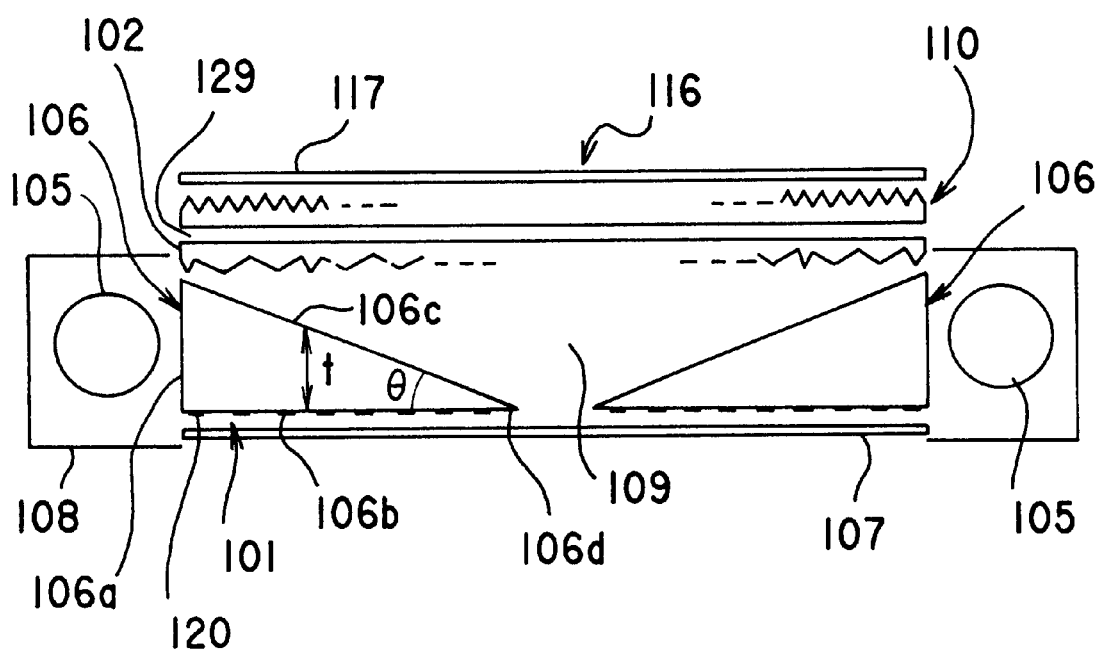
FIG. 18 is a cross-sectional view of a lighting device according to a tenth embodiment of the present invention.

As shown in FIGS. 18 and 19, the special linear prism plate 102 is provided so that the linear prisms 121 and 122 face downward and the longitudinal direction thereof is orthogonal to the aforementioned line 112, that is, parallel to the longitudinal direction of the light sources 105. Further, the special linear prism plate 102 is located above the light conducting plates 106 and below the normal linear prism plate 110. There is an air layer between the normal linear prism plate 110 and the special linear prism plate 102.

As shown in FIG. 22, each of the linear prisms 122 having a vertical angle (the angle of each apex) of 70° totally reflects an incident light 123 to thereby introduce the light 123 upward. An incident light 125 enters into each of the linear prisms 121 having a vertical angle of 140° so that a light 126 propagated through the prism plate 102 reaches at an angle equal to or greater than the critical angle. The light 126 is totally reflected by an upper surface 102a of the special linear prism plate 102, as indicated by the reference number 127. Then, the totally reflected light 127 goes out of the special linear prism plate 102 and is obliquely emitted downward, as indicated by the reference number 128, into the space 109. The first linear prisms 121 are parallel to the longitudinal direction of the light sources 105. Hence, the light 128 is efficiently oriented toward the center of the lighting device 100. That is, the linear prisms 121 and 122 of the special linear prism plate 102 are arranged in parallel with the longitudinal direction of the light sources 105 in order to facilitate propagation of light toward the center of the lighting device 100. It is preferable that the vertical angle of the first prisms 121 is equal to or greater than 110° and the vertical angle of the second prisms 122 is equal to or less than 110°.

Figure 23:
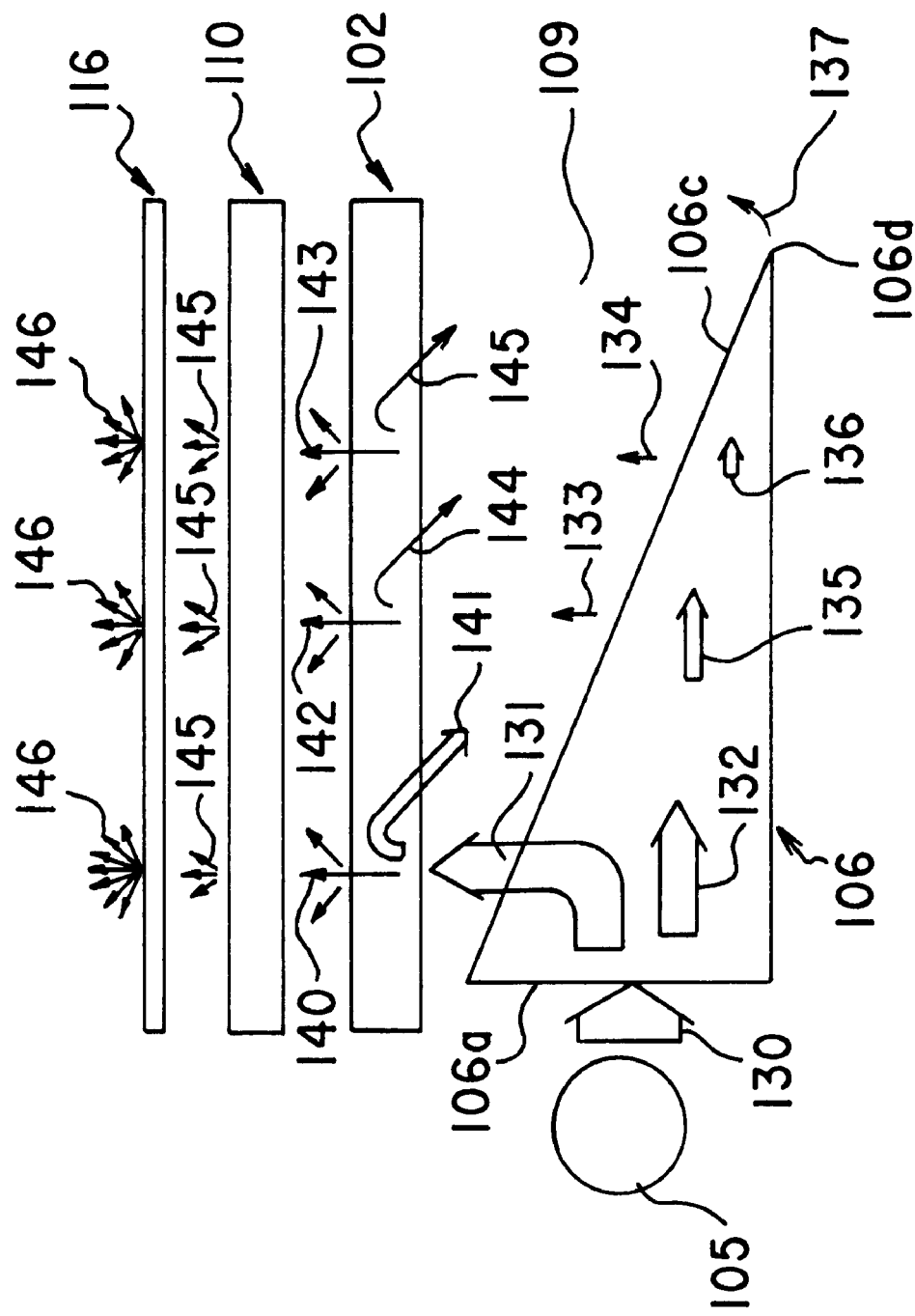
FIG. 23 is a cross-sectional view showing the operation of the lighting device shown in FIG. 18.

A description will now be given of the operation of the lighting device 100 with reference to FIG. 23. In FIG. 23, there are illustrated various arrows indicating rays of light. The direction of each arrow indicates the direction of propagation of the light. The thickness of each arrow indicates the amount of light. As the amount of light becomes larger, the corresponding arrow becomes thicker.

A light 130 emitted from the fluorescent tube 105 enters into the light conducting plate 106 via the incident surface 106a, and goes toward the edge 106d thereof. Most of the light 106 entering into the light conducting plate 106 is diffused in the vicinity of the incident surface 106 due to the diffusion pattern 101. Hence, a large amount of light 131 is emitted from a portion of the light-emitting surface 106b located in the vicinity of the incident light 106a. The reset 132 of light is propagated through the light conducting plate 106 toward the edge 106d thereof.

The light 132 originally has a small amount, and is diffused and emitted, as lights 133 and 134, from the light-emitting surface 106b during the propagation through the light conducting plate 106. Hence, the rays of light toward the edge 106d becomes smaller, as indicated by reference numbers 135 and 136, and a small amount of light 137 is emitted from the edge 106d. As a result of the above-mentioned mechanism, it becomes possible to eliminate a disadvantage in that the amount of luminance in a portion close to the edge 106d becomes greater than that in other portions.

The light 131 enters into the special linear prism plate 102. Some of the light which has entered into the special linear prism plate 102 is passed therethrough and emitted upward, as indicated by a reference number 140. The reset of the above light is reflected by the special linear prism plate 102 is returned to the space 109, as indicated by a reference number 141. The lights 133 and 134 partially pass through the special linear prism plate 102 and are emitted upward, as indicated by reference numbers 142 and 143. The rest of the lights 133 and 134 is reflected by the special linear prism plate 102 and are returned to the space 109, as indicated by reference numbers 144 and 145. The lights 141, 144 and 145 are reflected by the light-emitting surface 106c, and enter into the special linear prism plate 102 again. These lights partially pass through the special linear prism plate 102 and the rest thereof is reflected thereby.

The above operation is repeatedly performed, and an approximately constant amount of light is emitted from the whole upper surface 102a of the special linear prism plate 102. Hence, as will be described later, the whole emission surface 117 has a uniform brightness.

The light emitted upward from the special linear prism plate 102 enters into the normal linear prism plate 110, and is collected in the normal direction and emitted, as indicated by a reference number 145. Then, the light 145 is reflected by the diffusion sheet 116, and is emitted from the emission surface 117, as indicated by a reference number 146.

With the above-mentioned mechanism, there is no part having a larger amount of luminance than that of other parts in the emission surface 117 of the lighting device 100. That is, the part in the emission surface 117 corresponding to the edge 106d of the light conducting plate 106 has the same amount of luminance as the other parts. Further, the amount of luminance in the part of the emission surface 117 close to the fluorescent tube 105 is almost the same as that in the other parts. As a result, it becomes possible to obtain a uniform luminance distribution over the whole emission surface 117.

A description will now be given of characteristics of a liquid crystal display device equipped with the lighting device 100 as a back-lighting source for a liquid crystal panel. In FIG. 19, there is illustrated a liquid crystal panel 150 located above the lighting device 100. The liquid crystal panel 150 includes electrodes 151 for display in the X direction extending in the X direction, and electrodes 152 for display in the Y direction extending in the Y direction. A line 112 orthogonal to the fluorescent tube 105 extends in the X direction.

A description will now be given of the positions of the linear prisms 111, 121 and 122 (FIG. 19) with respect to the display electrodes 151 and 152. The linear prisms 111 and the linear prisms 121 and 122 cross at an angle $(90-\alpha)°$. Hence, it is difficult for the prisms 111, 121 and 122 to interfere with each other, so that Moire interference fringes cannot be generated. The linear prisms 111 cross the display electrodes 151 and 152 at an angle of approximately 45°. Hence, it is difficult for the linear prisms 111 and the display electrodes 151 and 152 to interfere with each other, so that Moire interference fringes cannot be generated.

A description will now be given of variations of the tenth embodiment of the present invention.

Figure 24:
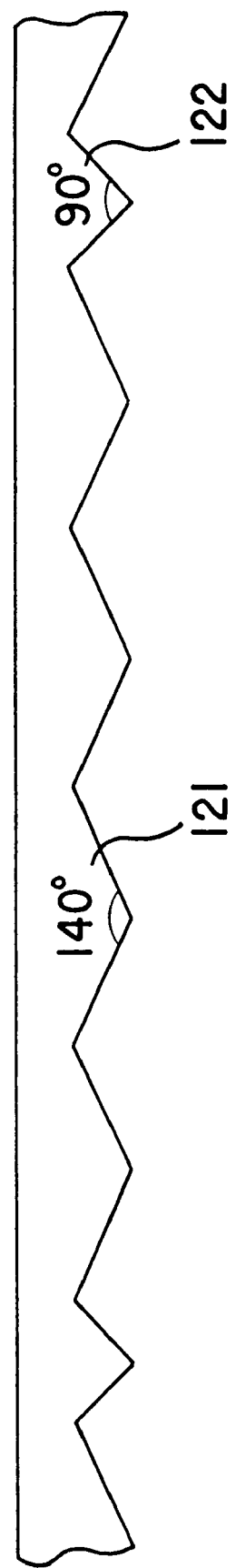
FIG. 24 is a cross-sectional view of a variation of the special linear prism plate.

FIG. 24 shows a variation 102A of the special linear prism plate 102 in which the ratio of the number of linear prisms 121 to the number of linear prisms 122 is 4:1. The linear prism plate 102A shown in FIG. 24 is capable of orienting a larger amount of light along the surface thereof than the linear prism plate 102 shown in FIG. 22.

Figure 25:
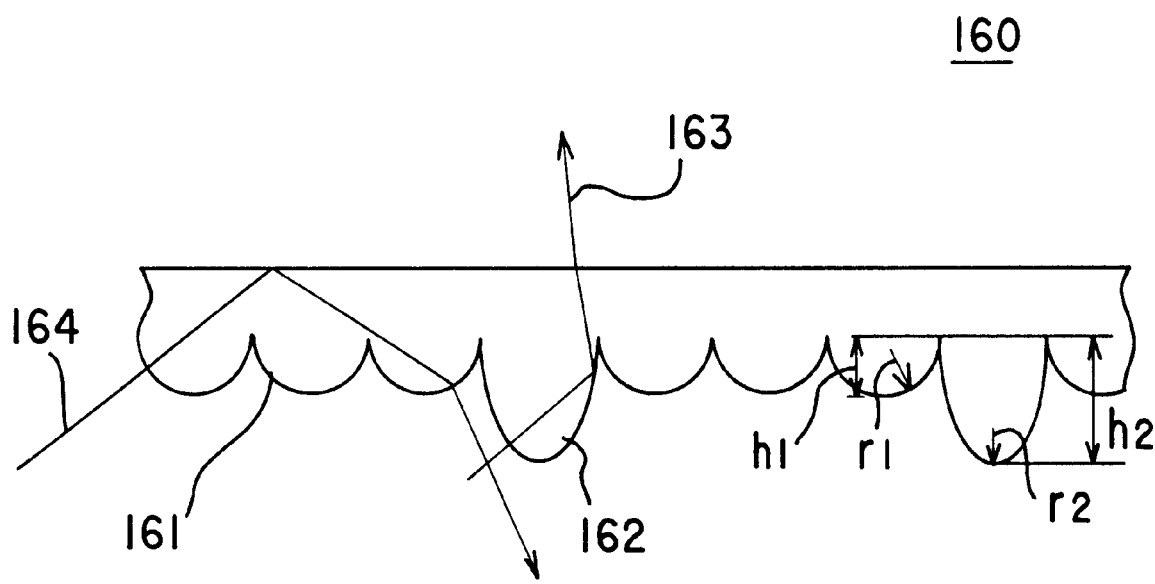
FIG. 25 is a cross-sectional view of a special lenticular plate.

FIG. 25 is an enlarged view of a special lenticular plate 160 used instead of the special linear prism plate 102. The lenticular plate 160 is located so that lenses face downward. More particularly, the lenticular plate 160 includes first lenses 161, each having a radius r1 and a height h1, and second lenses 162, each having a radius r2 and a height h2, in which h2>h1 and r2>r1. The ratio of the number of first lenses 161 to that of second lenses 162 is, for example, 3:1. As indicated by a reference number 163, the second lenses 162 function to orient light upward. Further, as indicated by a reference number 164, the first lenses 161 function to orient light downward and propagate it along the surface of the lenticular plate 160.

Figure 26:
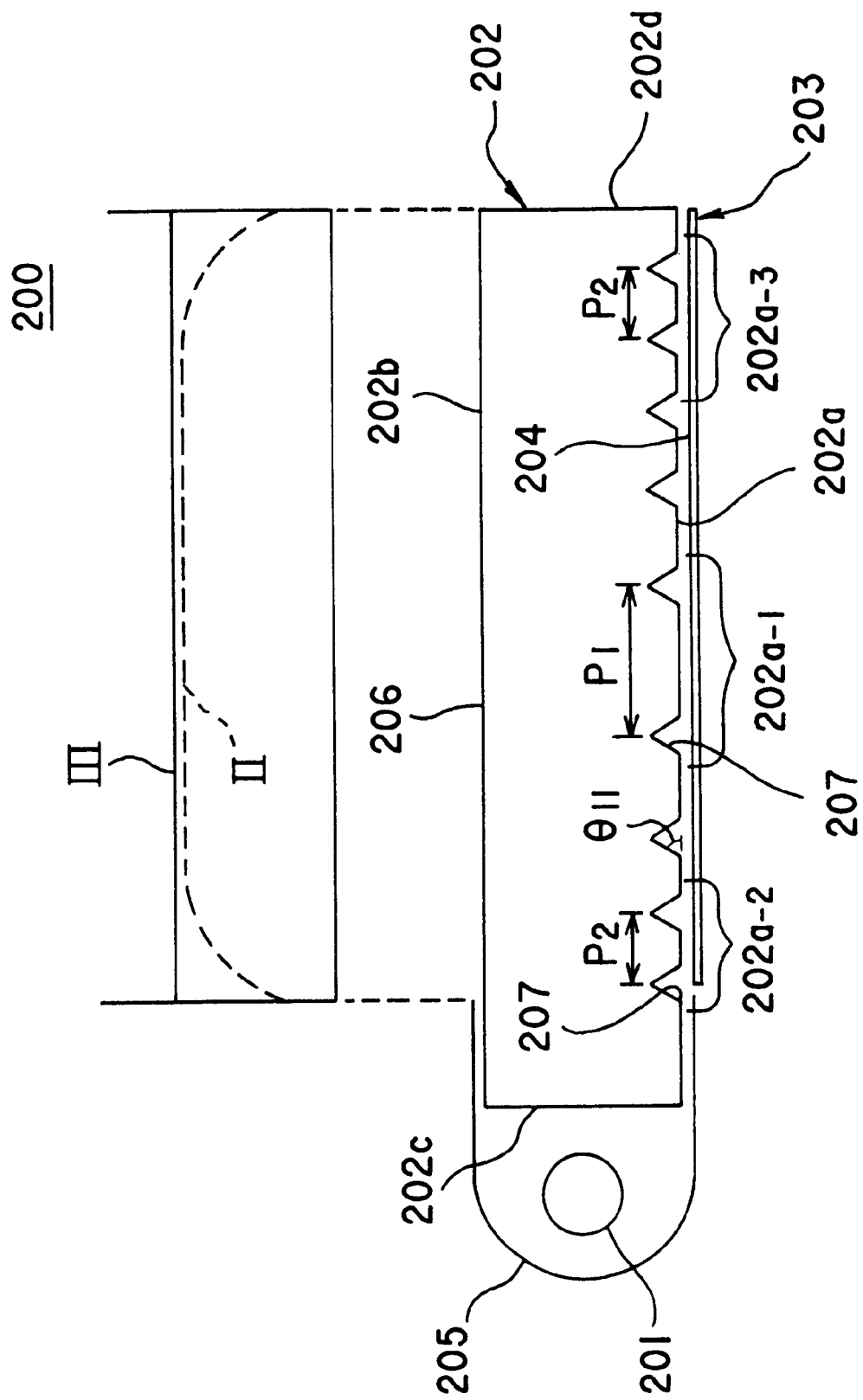
FIG. 26 is a diagram showing a lighting device according to an eleventh embodiment of the present invention.

A description will now be given, with reference to FIG. 26, of a lighting device 200 according to an eleventh embodiment of the present invention. The lighting device 200 includes a linear light source 201 formed with, for example, a fluorescent tube. A transparent light conducting plate 202 includes a back surface 202a, an emission surface 202b, an incident surface 202c and an end surface 202d. The incident surface 202c and the end surface 202d are perpendicular to the back surface 202a and the emission surface 202b. A reflection plate 203 having a reflection surface 204 is provided so as to face the back surface 202a of the light conducting plate 202. A reflection mirror 205 covers the light source 201. The lighting device 200 has an emission surface 206.

A plurality of grooves (concave portions) 207 are formed on the back surface 202a of the light conducting plate 202, and extend in the direction parallel to the incident surface 202c (vertical to the drawing sheet). The grooves 207 are arranged with a pitch P1 in a center portion $202a_{-1}$ of the back surface 202a. The pitch of the grooves 207 becomes larger as the distance from the center portion $202a_{-1}$ increases. The grooves 207 located in a portion $202a_{-2}$ close to the incident surface 202c and a portion $202a_{-3}$ close to the end surface 202d are arranged with a pitch P2 less (narrower) than the pitch P1 in the center portion $202a_{-1}$.

Figure 27:
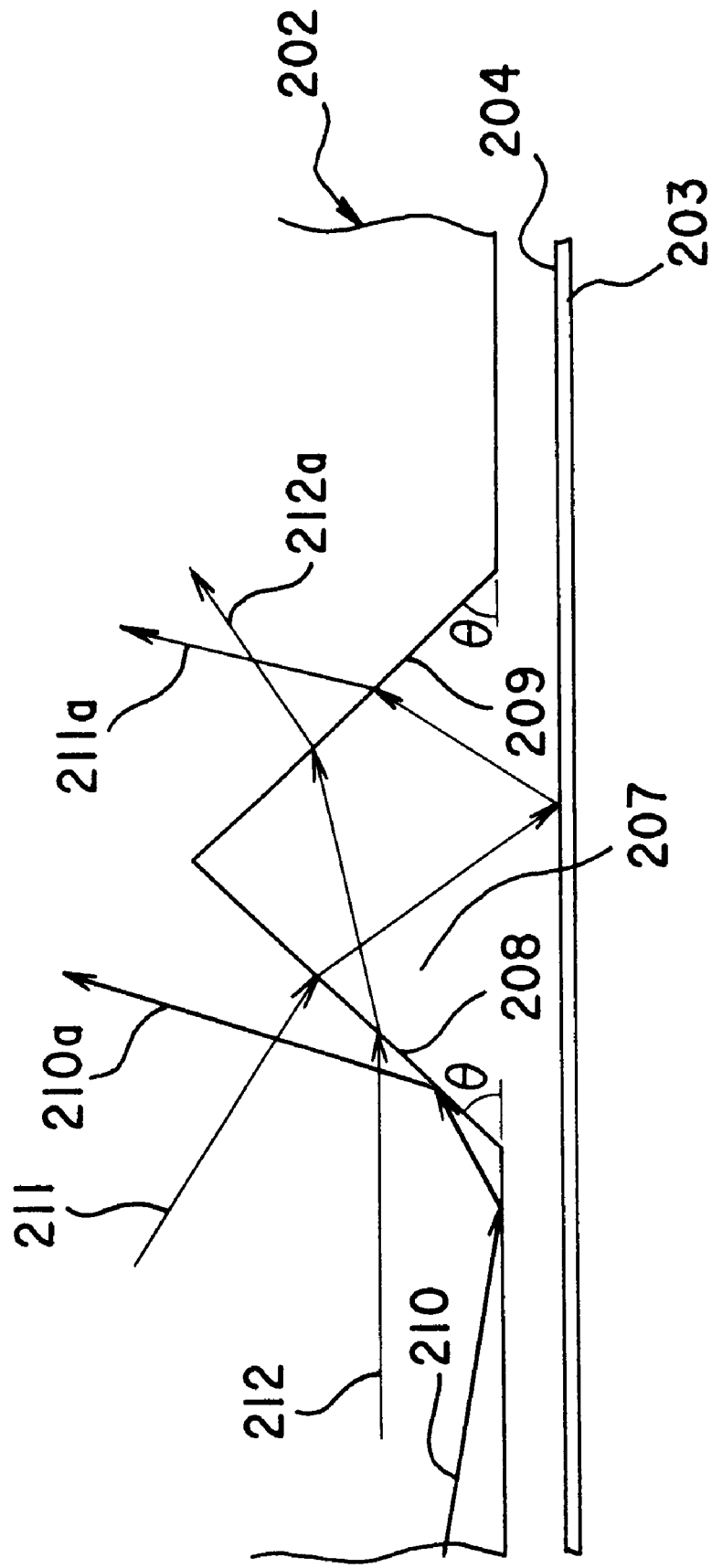
FIG. 27 is a cross-sectional view showing a groove formed in a light conducting plate used in the lighting device shown in FIG. 26.

As shown in FIG. 27, each groove 207 has a cross section of a triangular shape, and includes two flat slant surfaces 208 and 209, which are inclined at an angle $\Theta$ with respect to the horizontal surface. The angle $\Theta$ is selected so that the incident light is prevented from being returned to the fluorescent tube 201, and is set to, for example, 30°.

The grooves 207 function as follows. Some of the light that is emitted by the fluorescent tube 201 and enters into the light conducting plate 202 via the incident light 202c goes to one groove 207 shown in FIG. 27. The above light going to the groove 207 is classified into one of three rays of light 210, 211 or 212 due to the angle at which the light is projected on the slant surface 208. The light 210 is totally reflected by the slant surface 208, and travels to the emission surface 202b as indicated by a reference number 210a. The light 211 goes in the groove 207, and is reflected by the reflection surface 204 of the reflection plate 203, and enters into the light conducting plate 202 again via the slant surface 209. Then, the light 211 goes toward the emission surface 202b as light 211a. The light 212 goes in the groove 207, and passes therethrough. Then, the light 212 enters into the light conducting plate 202 again via the slant surface 209, and travels toward the end surface 202d, as light 212a. As described above, the grooves 207 function to efficiently orient the light that is propagated through the light conducting plate 202 and goes toward the back surface 202a to the light emitting surface 202b.

Conventionally, as disclosed in Japanese Laid-Open Patent Application 2-165504, grooves related to the above-mentioned grooves 207 are arranged with an equal pitch, and the surfaces forming the grooves are inclined so that all rays of light incident to the grooves are totally reflected. Hence, the luminance distribution on the emission surface obtained with the structure disclosed in the above Japanese document is as indicated by a curve II shown in FIG. 26, in which the luminance obtained in the vicinity of the incident surface 202c and in the vicinity of the end surface 202d is less than the luminance obtained in other portions.

On the other hand, according to the eleventh embodiment of the present invention, the arrangement of the grooves 207 is weighted as has been described previously. The weighted-pitch arrangement of the grooves 207 functions to increase the amounts of luminance obtained in the vicinity of the incident surface 202c and in the vicinity of the end surface 202d. Hence, an even luminance distribution as indicated by a curve III shown in FIG. 26 can be obtained in the entire emission surface.

Figure 28:
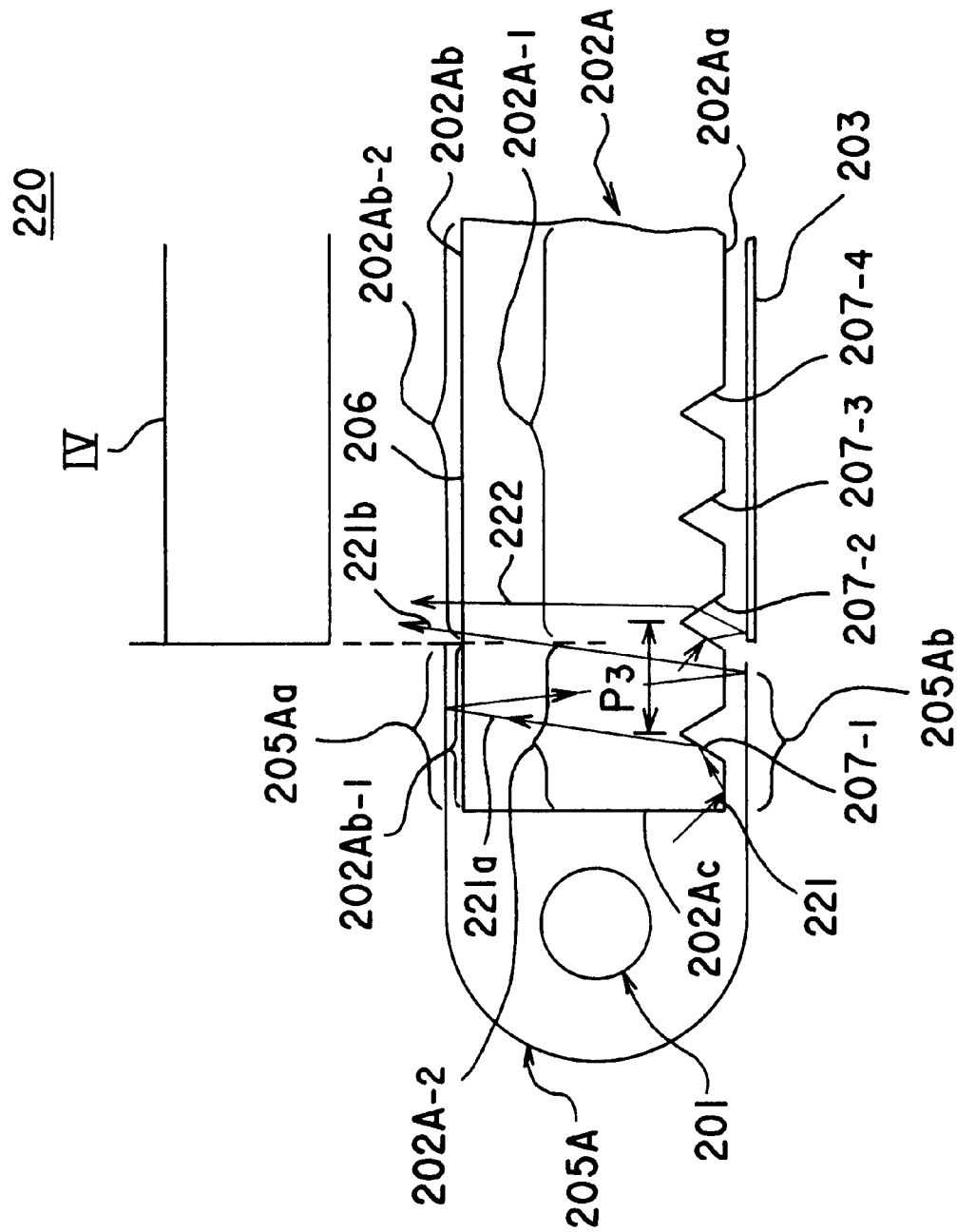
FIG. 28 is a diagram showing a lighting device according to a twelfth embodiment of the present invention.

FIG. 28 shows a lighting device 220 according to a twelfth embodiment of the present invention. In FIG. 28, parts that are the same as those shown in FIG. 26 are given the same reference numerals as previously. The grooves 207 formed on a back surface 202Aa of a transparent light conducting plate 202A are arranged with an identical pitch P3 in an area close to the fluorescent tube 201. The pitch in the other areas may be the same as or different from the pitch P3. Reference numerals $207_{-1}$, $207_{-2}$, . . . are given to the grooves 207 from the side close to the fluorescent tube 201. A reflection mirror 205A having an approximately U-shaped cross section covers not only the fluorescent tube 201 but also a portion $202Ab_{-1}$ corresponding to the groove $207_{-1}$.

The portion 202A$b_{-1}$ is a part of a light-emitting surface 202$a$B of the light conducting plate 202A. A reference number 205A$b$ is a part of the and covers the groove 207$_{-1}$ formed on a back surface 202A$a$ of the light conducting plate 202A. A portion 202A$_{-1}$ which is a part of the light conducting plate 202A functions as an emission surface (area). A reference numeral 202A$_{-2}$ indicates a light accumulating area, which accumulates light as will be described later.

A light 221 incident to the light conducting plate 202A from the fluorescent tube 201 via an incident surface 202A$c$ is reflected by one of the surfaces defining the groove 207$_{-1}$, and is oriented toward the surface 202A$b_{-1}$, as indicated by a reference numeral 221$a$. Then, the light goes out of the surface 202A$b_1$, and is reflected by the upper cover portion 205A$a$. Then, the reflected light enters into the light conducting plate 202A. The light goes toward the back surface 202A$a$, and goes out of the back surface 202A$a$. Then, the light is reflected by the lower cover portion 205A$b$, and enters into the light conducting plate 202A again. Then, the light goes upwards. The above operation is repeatedly performed, so that the light from the fluorescent tube 201 goes toward the emission area 202A$_{-1}$.

The surface area of the light-emitting surface 202A$b$ except for the part covered by the upper cover portion 205A$a$ is an effective light-emitting surface 202A$b_{-2}$. The grooves 207$_{-2}$ through 207$_{-5}$ located on the effective light-emitting surface function in the same manner as those used in the eleventh embodiment of the present invention, whereby the light propagated through the light conducting plate 202A is oriented upward. In a portion in the effective light-emitting surface 202A$b_{-2}$ close to the fluorescent tube 201, a light 221$b$ leaked from the light accumulating area 202A$_{-2}$ and going upward is superposed onto a light 222 refracted by the groove 207$_{-2}$. Hence, the amount of light is increased in the above portion. Hence, the luminance on the emission surface 206 of the lighting device 220 is even in the vicinity of the fluorescent tube 201, as indicated by a curve IV shown in FIG. 28.

Figure 29:
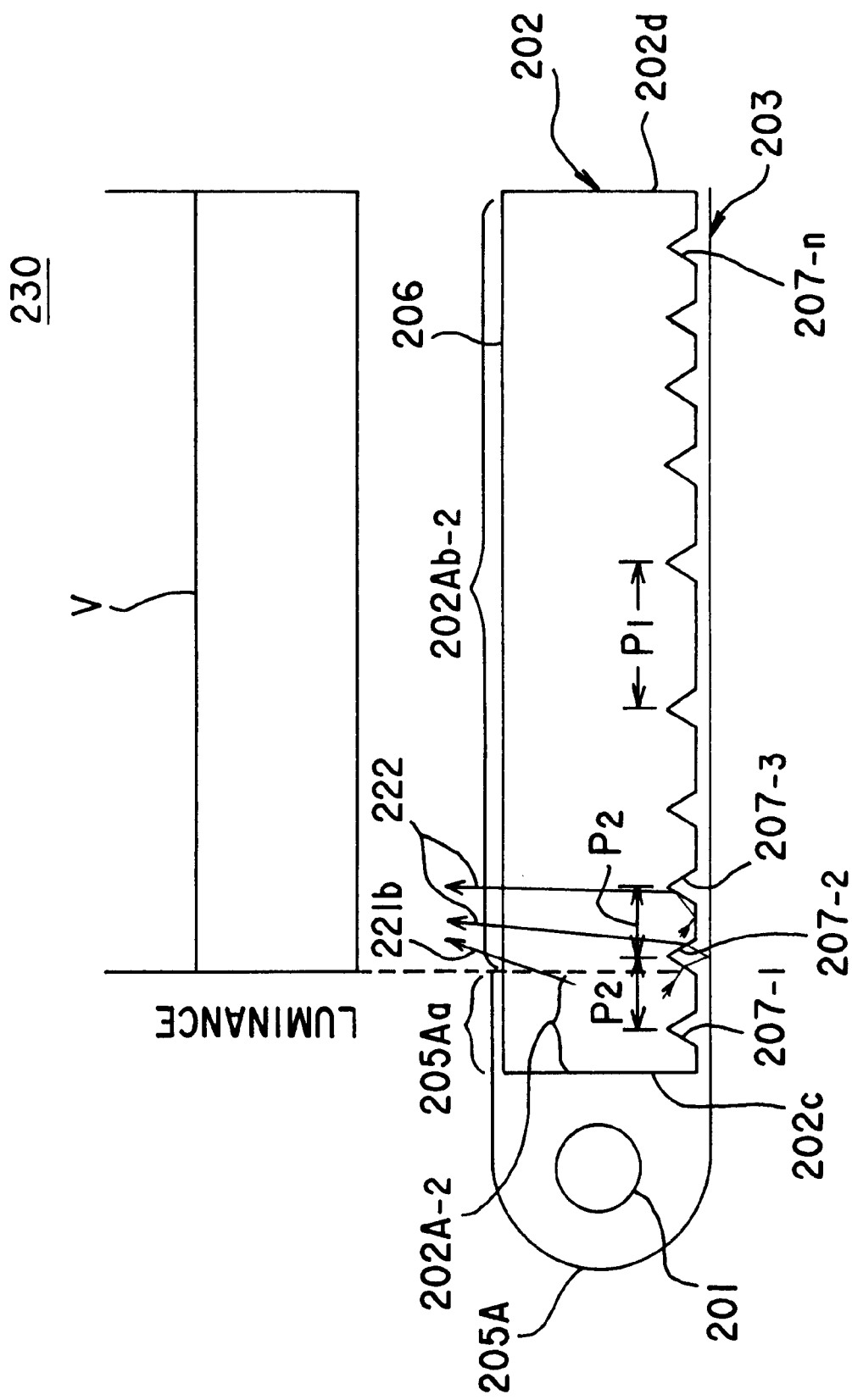
FIG. 29 is a diagram showing a lighting device according to a thirteenth embodiment of the present invention.

FIG. 29 shows a lighting device 230 according to a thirteenth embodiment of the present invention. The lighting device 230 corresponds to a combination of the lighting device 200 shown in FIG. 26 and the lighting device 220 shown in FIG. 28. In FIG. 29, parts that are the same as those shown in the previously described figures are given the same reference numerals as previously.

A light accumulating area 202A$_{-2}$ is formed by the groove 207$_{-1}$ and the upper cover portion 205A$a$ of the reflection mirror 205A. In a portion in the effective light-emitting surface 202A$b_{-2}$ close to the fluorescent tube 201, the light 221$b$ leaked from the light accumulating area 202A$_{-2}$ and going upward is superposed onto the light 222 refracted by the groove 207$_{-2}$. The pitch P2 with which the grooves 207$_{-1}$ and 207$_{-2}$ are arranged is less than the pitch P1 with which the grooves are arranged in the center portion of the back surface. Hence, the amount of the light 222 is increased. Hence, as indicated by a line V shown in FIG. 29, a constant luminance distribution can be obtained over the whole emission surface 206.

Figure 30:
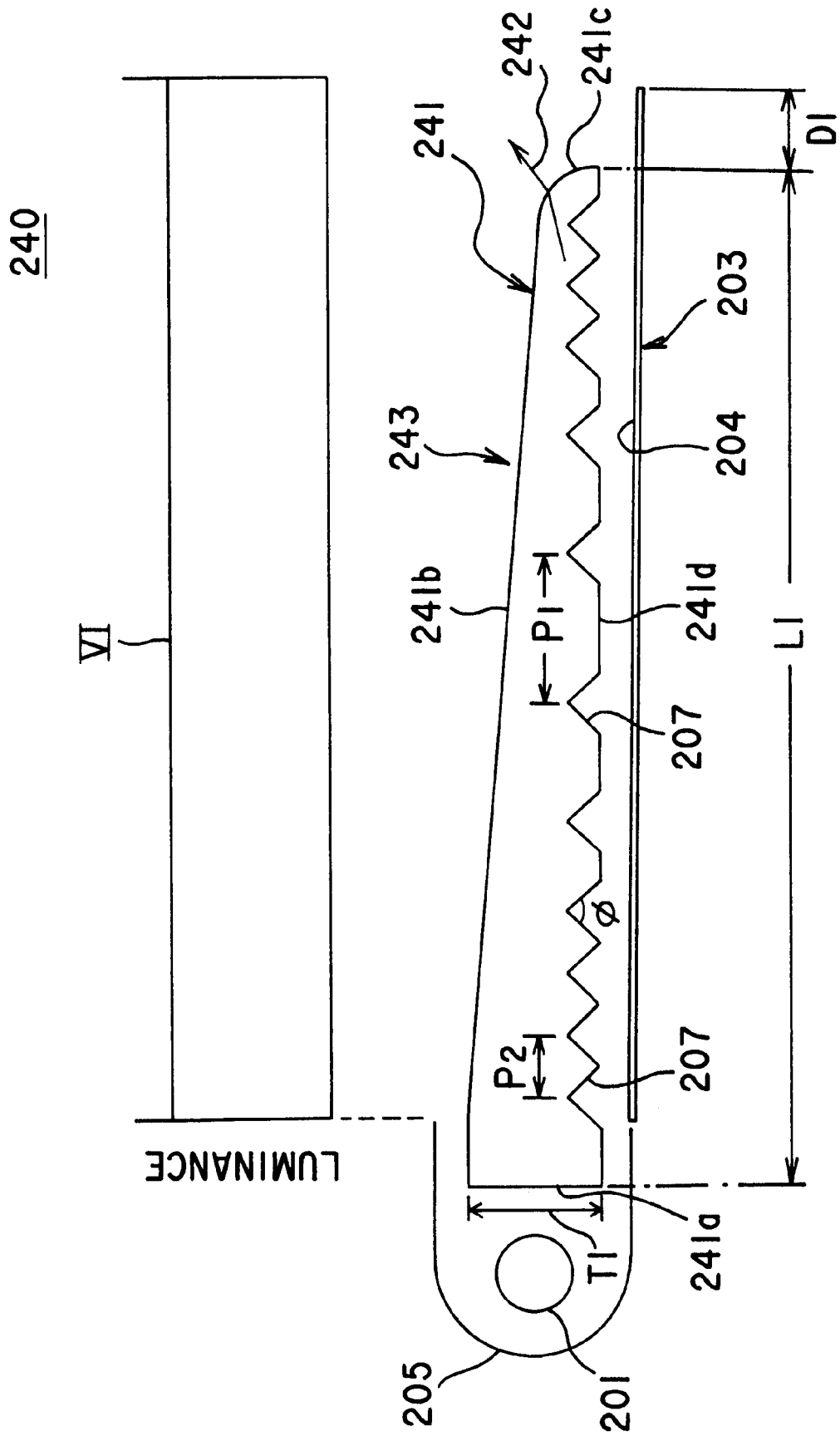
FIG. 30 is a diagram of a lighting device according to a fourteenth embodiment of the present invention.

FIG. 30 shows a lighting device 240 according to a fourteenth embodiment of the present invention. The lighting device 240 corresponds to a modification of the lighting device 200 shown in FIG. 26 in which the light conducting plate 202 is modified. In FIG. 30, parts that are the same as those shown in FIG. 26 are given the same reference numerals as previously.

As shown in FIG. 30, a transparent light conducting plate 241 used in the lighting device 240 shown in FIG. 30 has an approximately wedge-shaped cross section, and has a slant light-emitting surface 241$b$ and a curved end surface 241$c$. A back surface 241$d$ of the light conducting plate 241 is a flat surface on which the grooves 207 are formed. An incident surface 241$a$ of the light conducting plate 241 is perpendicular to the back surface 241$d$ thereof. As compared with the vertical end surface 202$d$ shown in FIG. 29, the curved end surface 241$c$ functions to make it difficult for the light propagated through the light conducting plate 241 from being reflected by the surface 241 and to cause the light to be emitted upward. Hence, the light is efficiently emitted from the end portion of the light conducting plate 241, so that the luminance obtained at the end portion thereof can be enhanced. As indicated by a line VI shown in FIG. 30, an even luminance distribution can be obtained over the whole emission surface 243.

The length L1 of the light conducting plate 243 is approximately equal to, for example, 210 mm, and the thickness T1 thereof is approximately equal to, for example, 5 mm. Further, the width of the light conducting plate 243 is approximately equal to, for example, 160 mm. The distance D1 (the size of the space) is approximately equal to, for example, 9 mm. The angle $\phi$ of the grooves 207 is equal to, for example, 120°, and the depth of the grooves is equal to, for example, 0.025 mm. In practice, it is preferable to set the distance D1 to 9 mm or more and set the thickness T1 to 5 mm or more.

Figure 31:
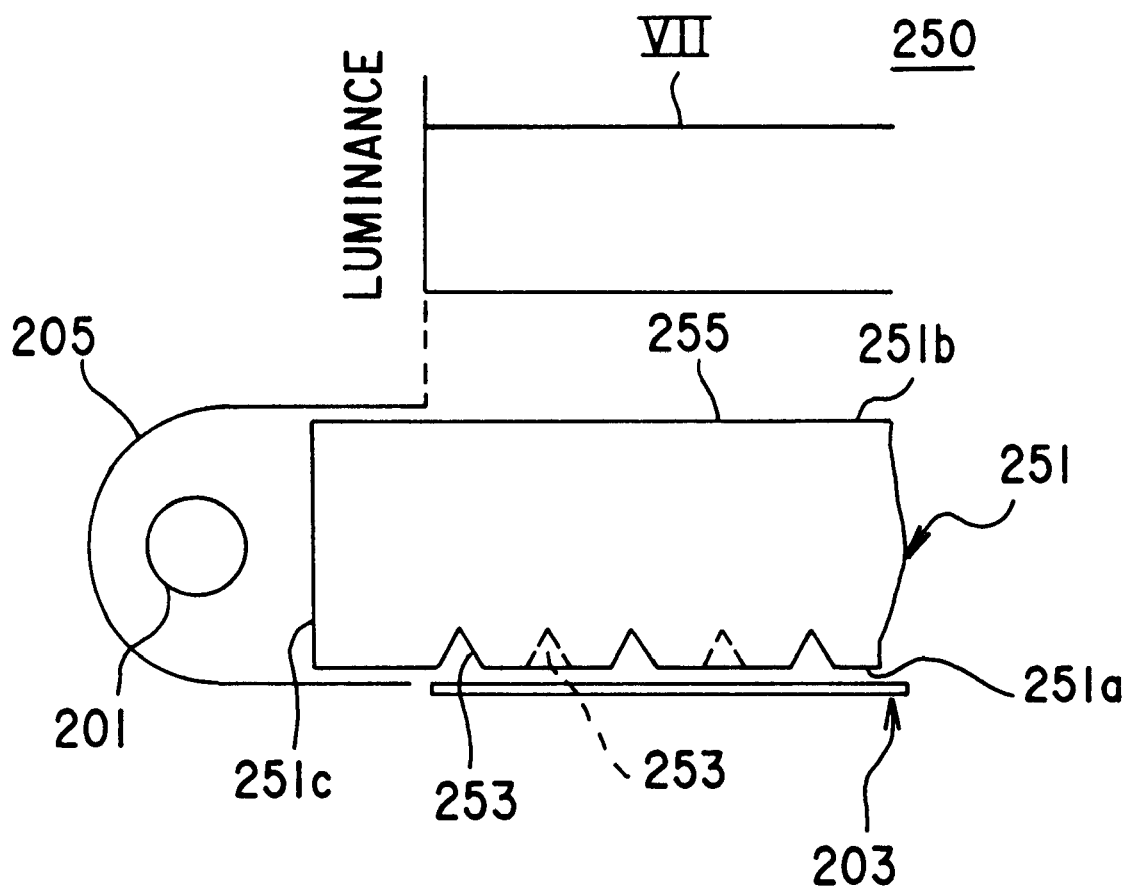
FIG. 31 is a diagram of a lighting device according to a fifteenth embodiment of the present invention.
Figure 32:
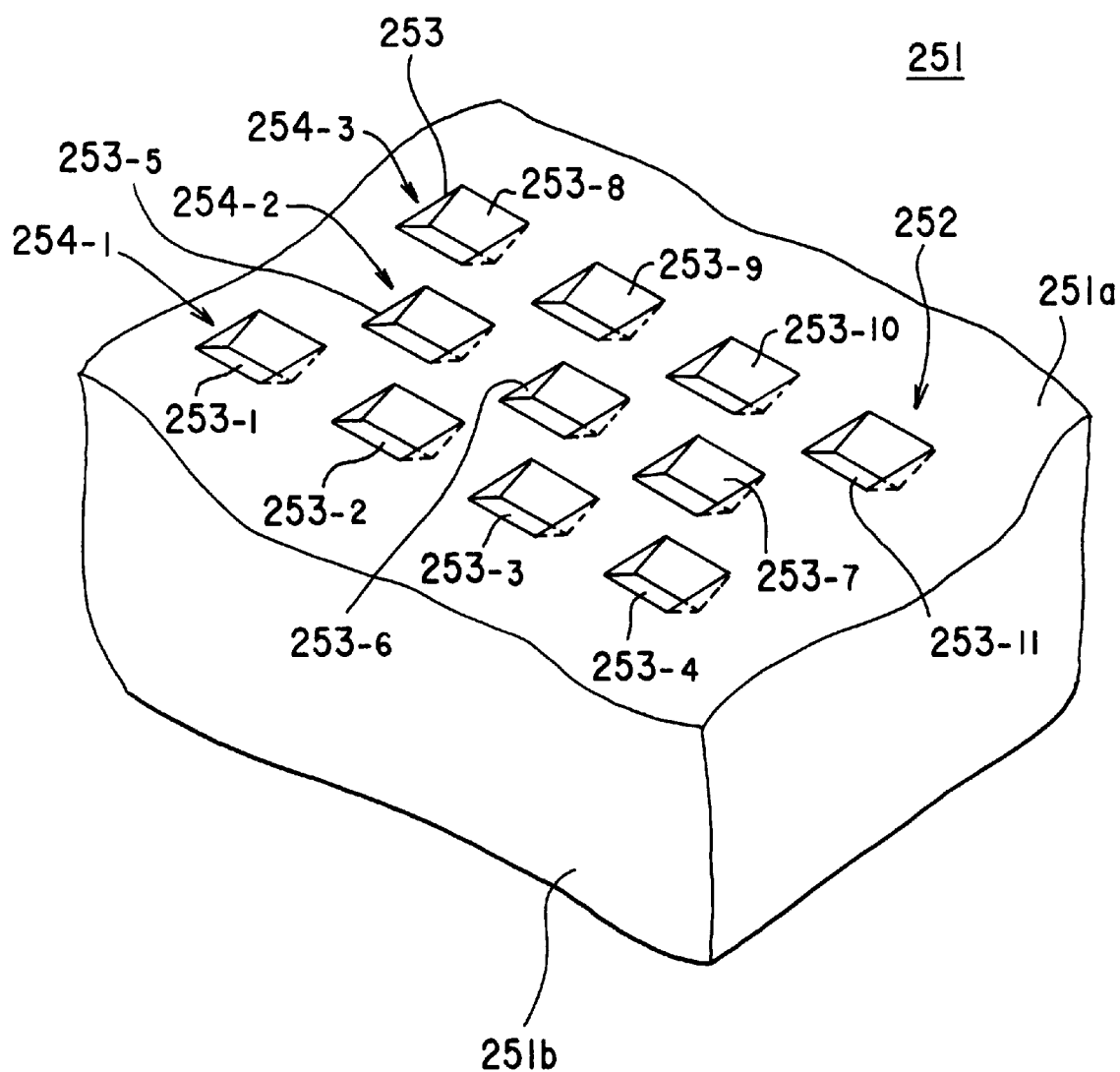
FIG. 32 is a perspective view showing an arrangement of a group of pits formed on the back surface of a light conducting plate used in the lighting device shown in FIG. 31.

FIG. 31 shows a lighting device 250 according to a fifteenth embodiment of the present invention. In FIG. 31, parts that are the same as those shown in FIG. 25 are given the same reference numerals as previously. The lighting device 250 includes a transparent light conducting plate 251, which includes a group 252 of pits (concave portions) formed on a back surface 251$a$ as shown in FIGS. 31 and 32. The group of pits 252 includes a large number of pits 253. Each of the pits 253 has an approximately triangle-shaped cross section, and functions to orient propagated light reaching the back surface 251$a$ toward a light-emitting surface 251$b$ in the same manner as the grooves 207 shown in FIG. 25.

The pit group 252 includes a pit alignment including pits 253$_{-1}$ through 253$_{-4}$, a pit alignment 254$_{-1}$ including pits 253$_{-5}$ through 253$_{-7}$, and a pit alignment 254$_{-3}$ including pits 253$_{-8}$ through 253$_{-11}$. The pit alignments 254$_{-1}$, 254$_{-2}$ and 254$_{-3}$ are parallel to each other and are arranged in a zigzag form. With the above arrangement, it becomes possible to make it possible to further equalize the amount of light oriented from the back surface 251$a$ to the light-emitting surface 251$b$ in the whole back surface 251$a$, a compared with use of the grooves 207. Hence, a luminance fluctuation caused on an emission surface 255 of the lighting device 250 due to the presence of pits can be suppressed, as compared with the lighting device 200 shown in FIG. 26, as indicated by a line VII shown in FIG. 31.

Figure 33:
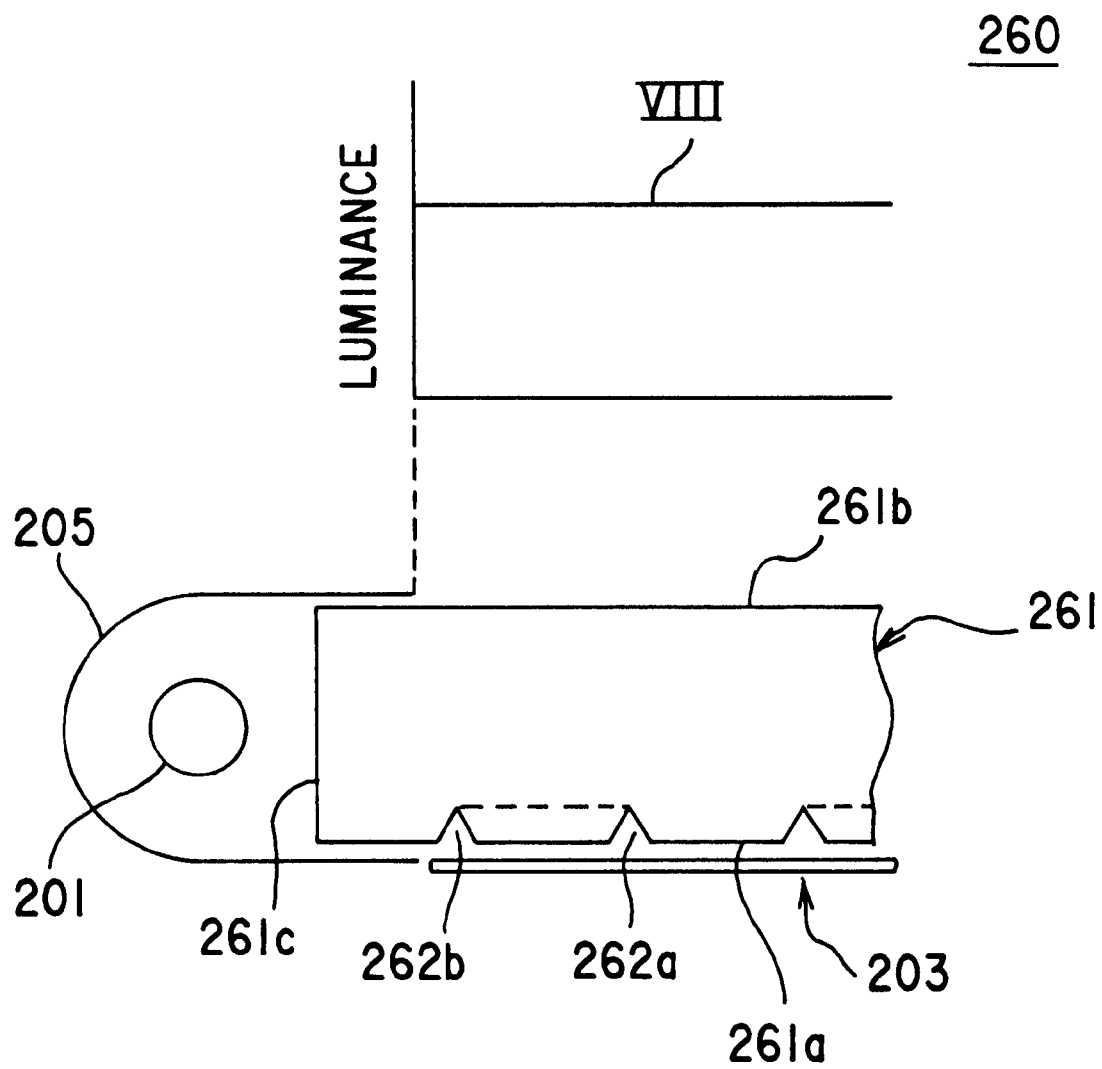
FIG. 33 is a diagram of a lighting device according to a sixteenth embodiment of the present invention.
Figure 34:
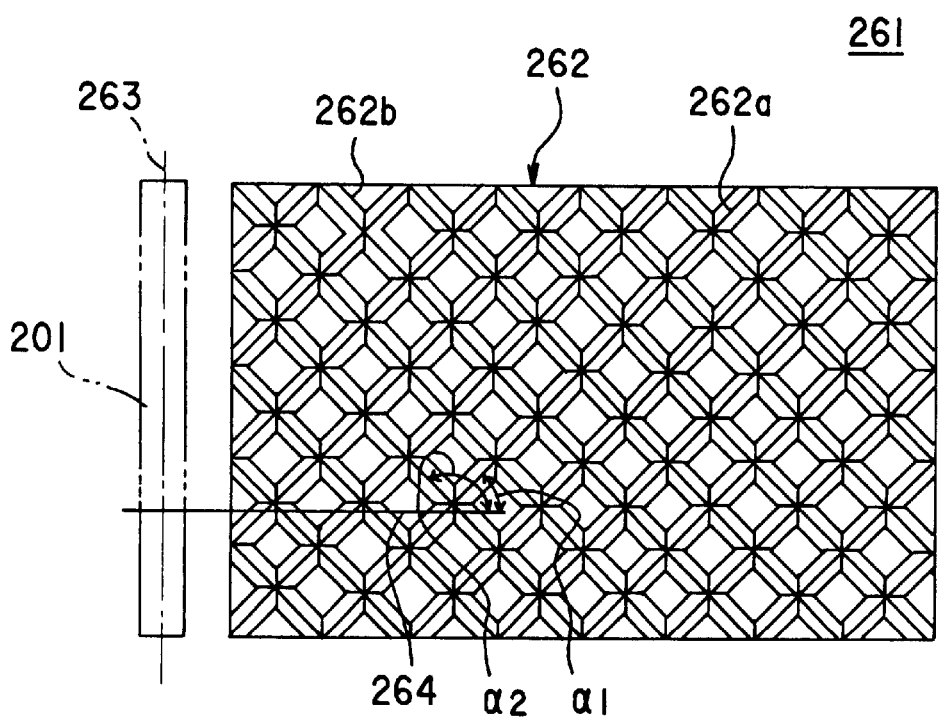
FIG. 34 is a bottom view of the back surface of the light conducting plate shown in FIG. 33.
Figure 35:
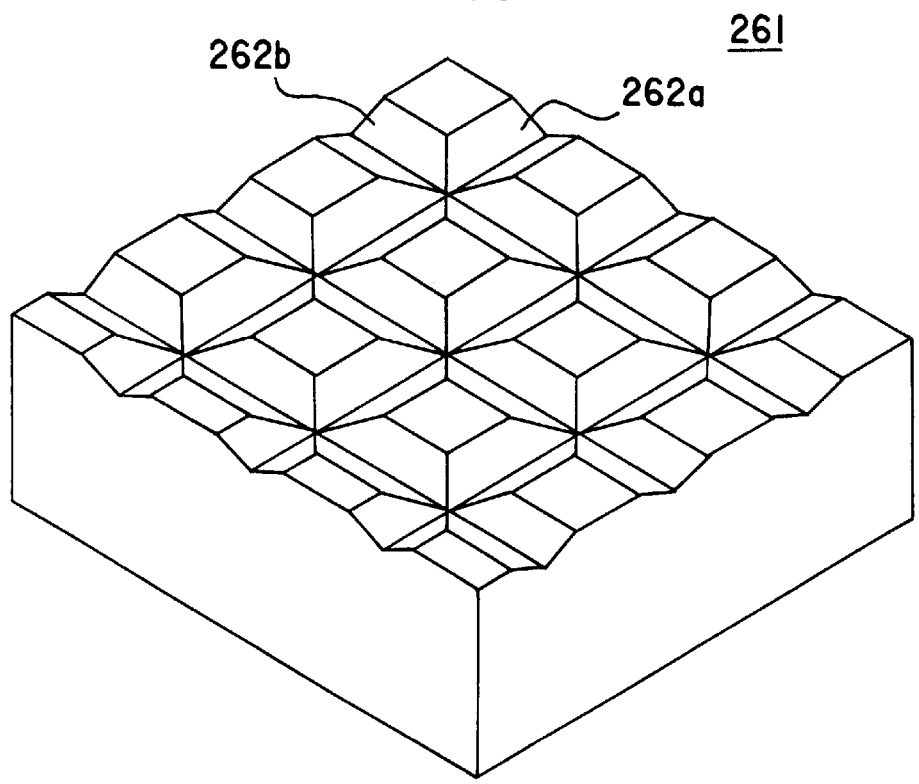
FIG. 35 is a perspective view of the back surface of the light conducting plate shown in FIG. 34.

FIG. 33 shows a lighting device 260 according to a sixteenth embodiment of the present invention. In FIG. 33, parts that are the same as those shown in FIG. 26 are given the same reference numerals as previously. The lighting device 260 includes a transparent light conducting plate 261, which includes a group 262 of grooves formed on a back surface 261$a$, as shown in FIGS. 34 and 35. The group 262 includes first grooves 262$a$ and second grooves 262$b$. The first grooves 262$a$ are obliquely arranged at an acute angle $\alpha_1$ with respect to a line 264 orthogonal to an axial line 263 of the fluorescent tube 201. The second grooves 262$b$ are obliquely arranged at an angle $\alpha_2$ with respect to the above line 264. The grooves 262a and 262b cross at a large number of points. Hence, it becomes difficult for the grooves to be seen from the outside of the lighting device 260, as compared with the lighting device 200 shown in FIG. 26. Hence, the lighting device 260 has an even luminance distribution over the whole emission surface, as indicated by a line VIII shown in FIG. 33.

Figure 36:
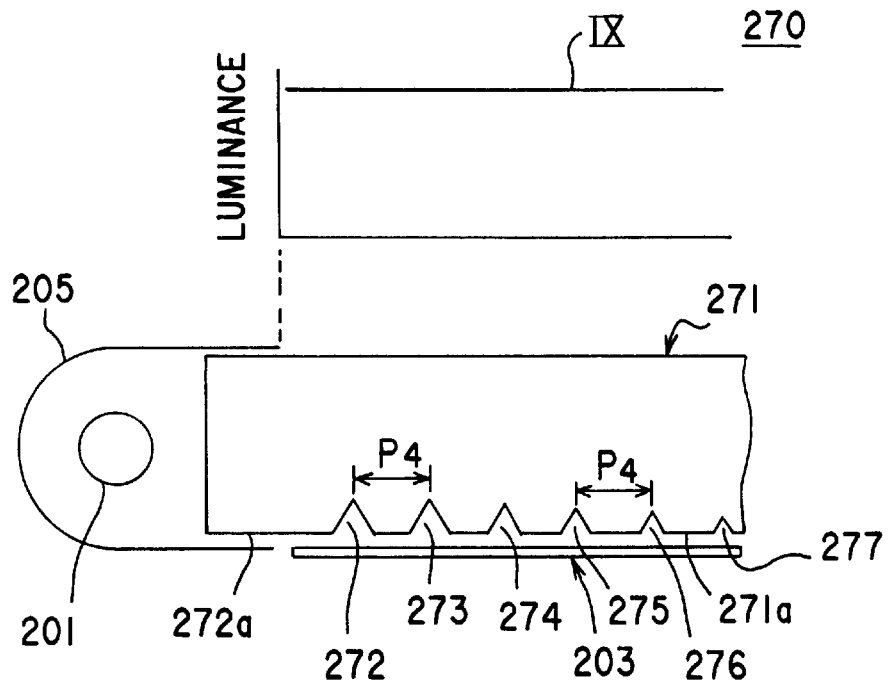
FIG. 36 is a diagram of a lighting device according to a seventeenth embodiment of the present invention.

FIG. 36 shows a lighting device 270 according to a seventeenth embodiment of the present invention. In FIG. 36, parts that are the same as those shown in FIG. 26 are given the same reference numbers as previously. The lighting device 270 includes a transparent light conducting plate 271, which includes a group 271 of grooves formed on a back surface 271a thereof. The group 271 includes grooves 272 through 277. The sizes of the grooves 272 through 277 become larger as the distance from the fluorescent tube 201 becomes smaller. The grooves 272 through 277 are arranged with a constant pitch P4, which is less than the pitch P1 shown in FIG. 26. Hence, it becomes difficult for the grooves to be seen from the outside of the lighting device 270, as compared with the lighting device 200 shown in FIG. 26. Hence, the lighting device 270 has an even luminance distribution over the whole emission surface, as indicated by a line IX shown in FIG. 36.

Figure 37:
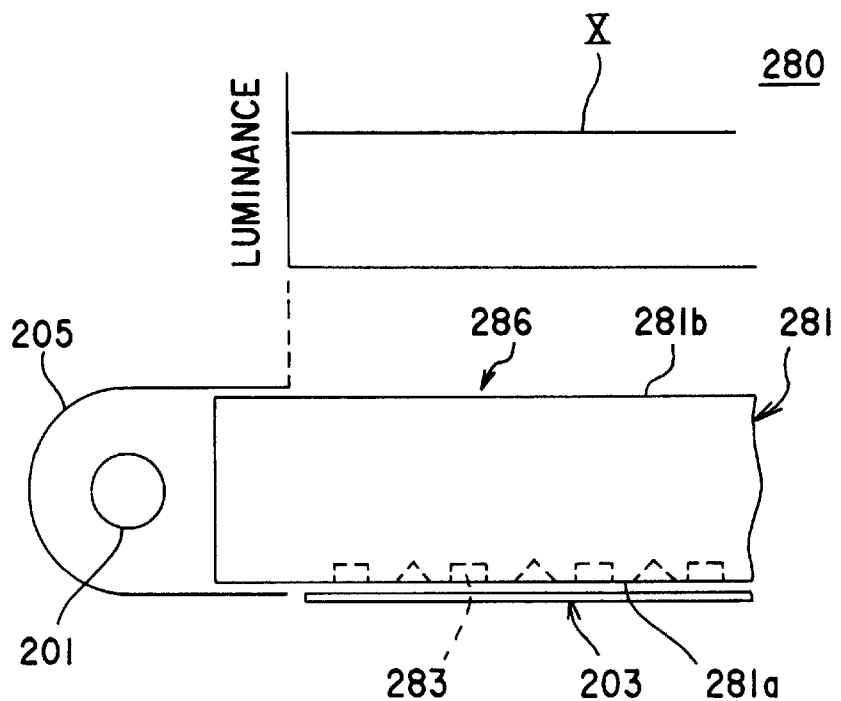
FIG. 37 is a diagram of a lighting device according to an eighteenth embodiment of the present invention.
Figure 38:
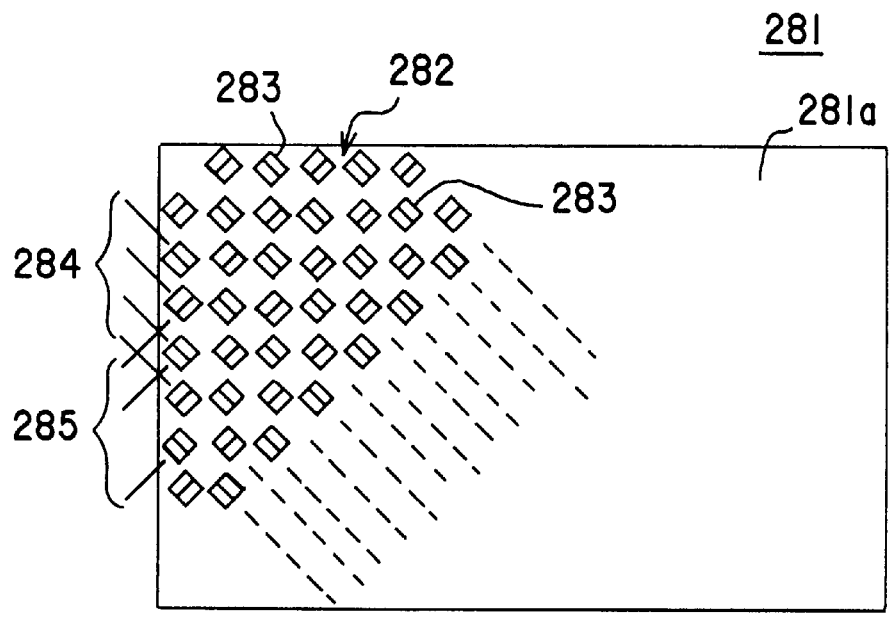
FIG. 38 is a bottom view of the back surface of a light conducting plate shown in FIG. 37.

FIG. 37 shows a lighting device 280 according to an eighteenth embodiment of the present invention. In FIG. 37, parts that are the same as those shown in FIG. 26 are given the same reference numerals as previously. The lighting device 280 includes a transparent light conducting plate 281. As shown in FIGS. 37 and 38, a group 282 of pits are formed on a back surface 281a of the light conducting plate 281. The pit group 282 includes a large number of pits 283. Each of the pits 283 has a triangular cross section, and functions to orient light propagated through the light conducting plate 281 and reaching the back surface 281a toward a light-emitting surface 281b. The pit group 282 includes first pit alignments 284 inclined on the left-hand side, and second pit alignments 284 inclined on the right-hand side. The pit alignments 284 and 285 cross. Hence, it becomes possible to orient an increased amount of light toward the light-emitting surface 281b, as compared with use of the grooves 207. As a result, the lighting device 28 has a suppressed luminance fluctuation and has an even luminance distribution over the whole emission surface, as indicated by a line X shown in FIG. 37.

Figure 39:
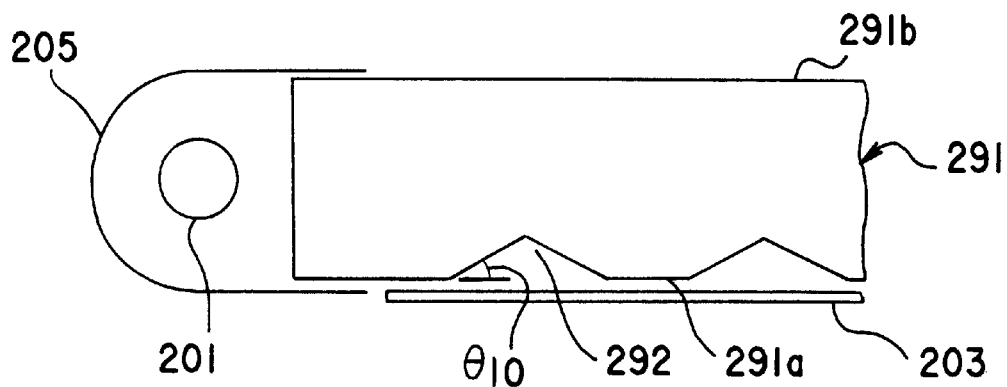
FIG. 39 is a cross-sectional view of a lighting device according to a nineteenth embodiment of the present invention.
Figure 41:
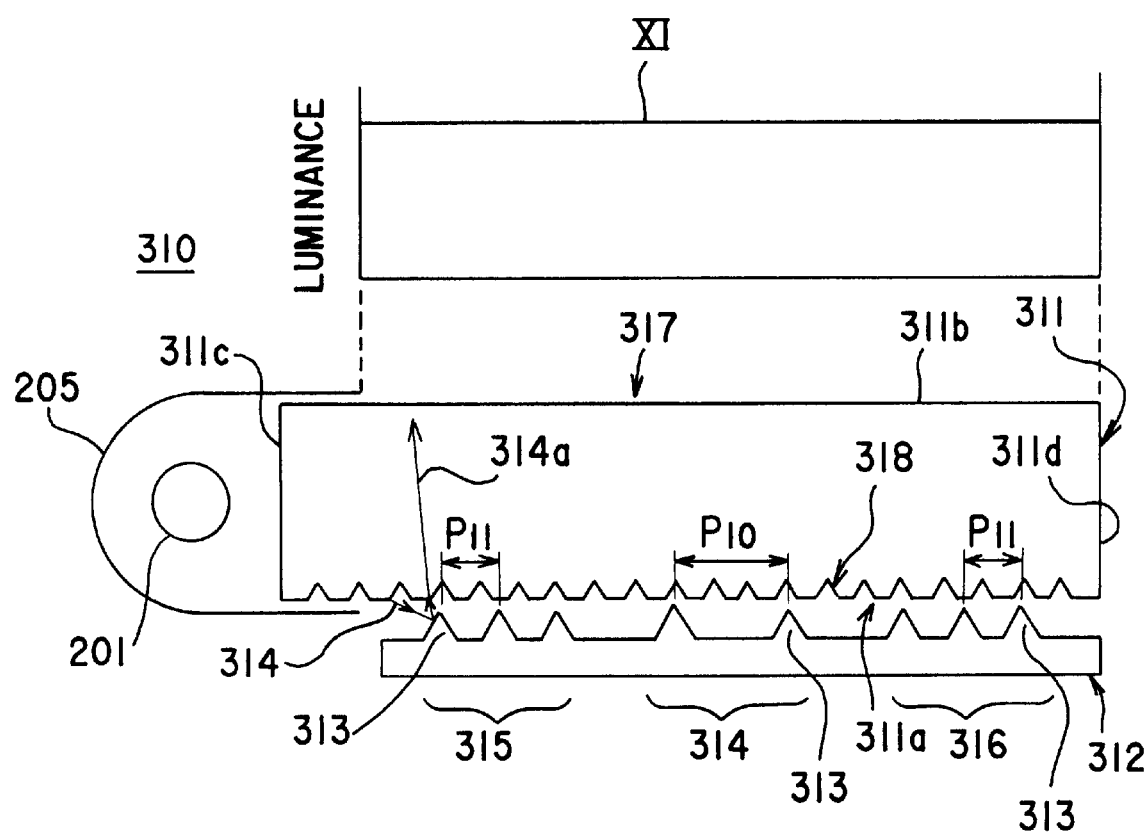
FIG. 41 is a diagram of a lighting device according to a twenty-first embodiment of the present invention.

FIG. 39 shows a lighting device 290 according to a nineteenth embodiment of the present invention. In FIG. 41, parts that are the same as those shown in FIG. 26 are given the same reference numerals. The lighting device 290 includes a transparent light conducting plate 291, which includes grooves 292 formed on a back surface 291a thereof. Each of the grooves 292 has a triangular cross section. The angle $\Theta 10$ of the slope of each groove 292 with respect to the flat portions of the back surface 291a is considerably less than the angle $\Theta 11$ shown in FIG. 26. When the angle $\Theta 10$ is relatively small, each groove 292 has a small capability of orienting light toward a light-emitting surface 291b. In the above manner, it becomes possible to vary the amount of light emitted from the light-emitting surface 291b by changing the angle $\Theta 10$.

Figure 40:
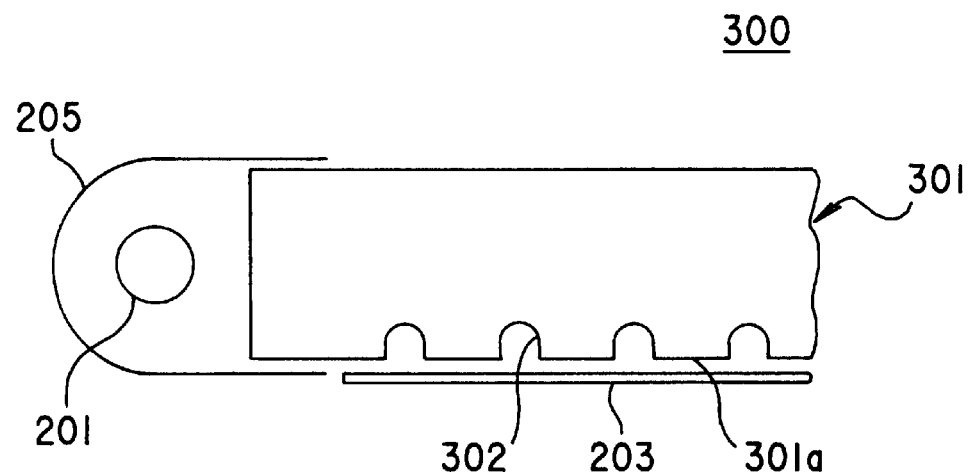
FIG. 40 is a cross-sectional view of a lighting device according to a twentieth embodiment of the present invention.

FIG. 40 shows a lighting device 300 according to a twentieth embodiment of the present invention, which includes a transparent light conducting plate 310. As shown in FIG. 40, U-shaped grooves 302 are formed on a back surface 301a of the light conducting plate 310.

FIG. 41 shows a lighting device 310 according to a twenty-first embodiment of the present invention, which includes a light conducting plate 311 and a reflection plate 312. Grooves 318 are formed on a back surface 311a of the light conducting plate 311 with a constant pitch. The reflection plate 312 includes a large number of projections 313, which face the back surface 311a. The projections 313 reflect light leaked from the grooves 318 formed on the back surface 311a, and cause the leaked light to enter into the light conducting plate 311 again, as indicated by reference number 314a. The projections 313 are arranged with a pitch P10 in a center portion 314. The pitch of projections 313 becomes smaller as the distance from the center portion 314 increases. The projections 313 are arranged in areas 315 and 316 respectively close to the light source 201 and an end surface 311d with a pitch P11 less than the pitch P10. Rays of light leaked from the area 315 in the vicinity of the light source 201 and from the area 316 in the vicinity of the end surface 311d can be returned to the light conducting plate 311 and emitted from an emission surface 317 more efficiently than the rays of light leaked from the center portion 314. Hence, as indicated by a line XI shown in FIG. 41, an even luminance distribution can be obtained over the emission surface 317.

It will be noted that various combinations of the aforementioned embodiments can be made with ease.

Figure 42:
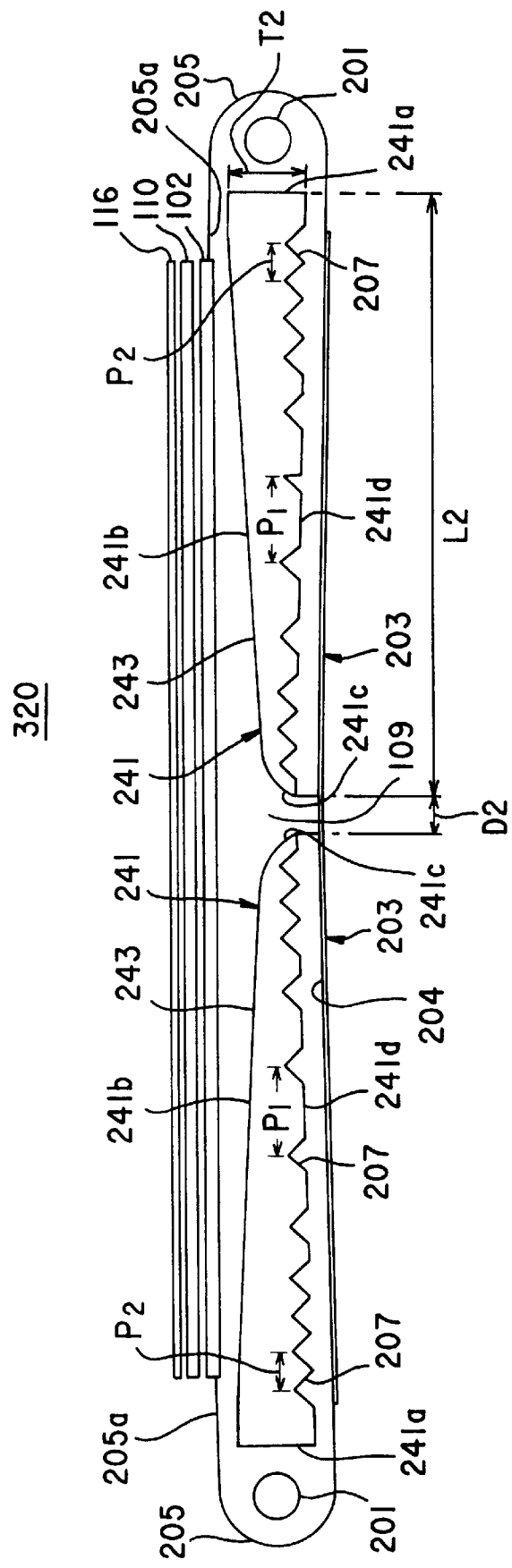
FIG. 42 is a cross-sectional view of one of possible combinations of the above embodiments of the present invention.

FIG. 42 shows a combination of the structures shown in FIGS. 18, 29 and 30. In FIG. 42, those parts that are the same as those shown in FIGS. 18, 29 and 30 are given the same reference numerals as previously. A lighting device 320 shown in FIG. 42 includes two transparent light conducting plates 241, two light sources 201, and two reflection mirrors 205. Each of the light conducting plates 241, which are arranged so that the edges 241c face each other via the space 109, has the same structure as shown in FIG. 30. Each of the reflection mirrors 205 includes the upper cover portion 205Aa, which covers one or more grooves close to the associated light source 201. The grooves 207 of the light conducting plates 241 face the reflection plate 203 having the reflection surface 204. The special linear prism plate 102, the normal linear prism plate 110 and the diffusion sheet 116 are provided in the same manner as shown in FIG. 18. The vertical angle of each of the grooves 207 is, for example, 120°. The angle of the inclined surface 241c with respect to the reflection plate 203 is, for example, 300.

The length L2 of the two identical light conducting plates 243 is equal to, for example, 210 mm, and the thickness T2 thereof is approximately equal to, for example, 9.3 mm. Further, the width of the light conducting plate 243 is approximately equal to, for example, 83 mm. The distance D2 (the size of the space 109) is equal to 4 mm or more. The angle $\phi$ of the grooves 207 is equal to, for example, 120°, and the depth of the grooves is equal to, for example, 0.025 mm.

Figure 43:
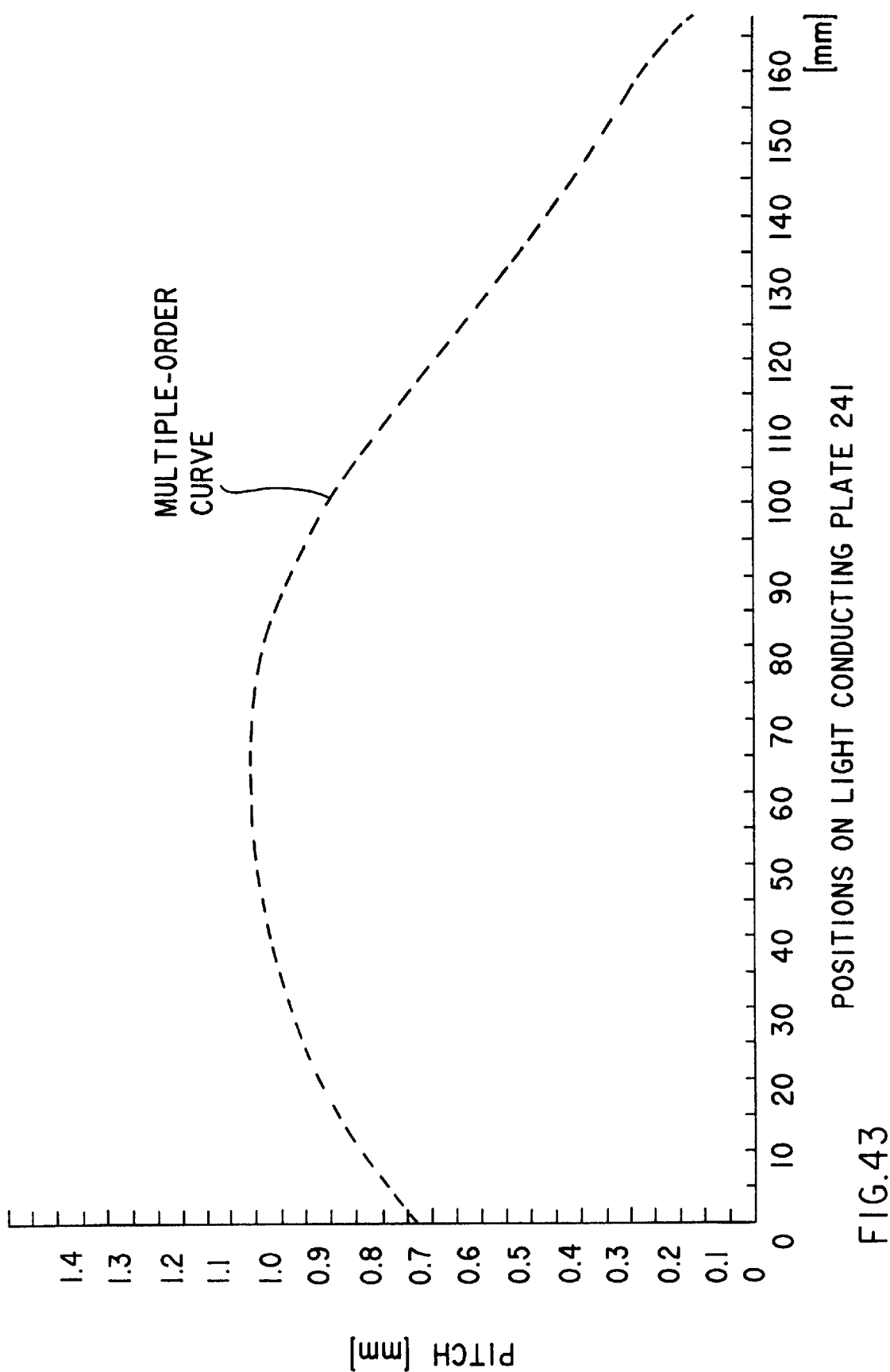
FIG. 43 is a graph showing a variation in the pitch with which grooves or pits are arranged.

FIG. 43 is a graph a variation in the pitch as a function of the distance on the light conducting plate 241 from the incident surface 241a. As shown in FIG. 43, the pitch P1 for the grooves 207 located in the center portion has a relatively large value, and the pitch P2 for the grooves located in the vicinity of the incident surface 241a and the end surface 241c has a relative small value. As shown in FIG. 43, it is possible to gradually vary the pitch. The graph of FIG. 43 can be applied to the embodiments having the grooves. In general, the plurality of concave portions are arranged at pitches expressed by a multiple-order curve as a function of a distance on the bottom surface of the light conducting plate from the side thereof facing the light source.

Figure 44:
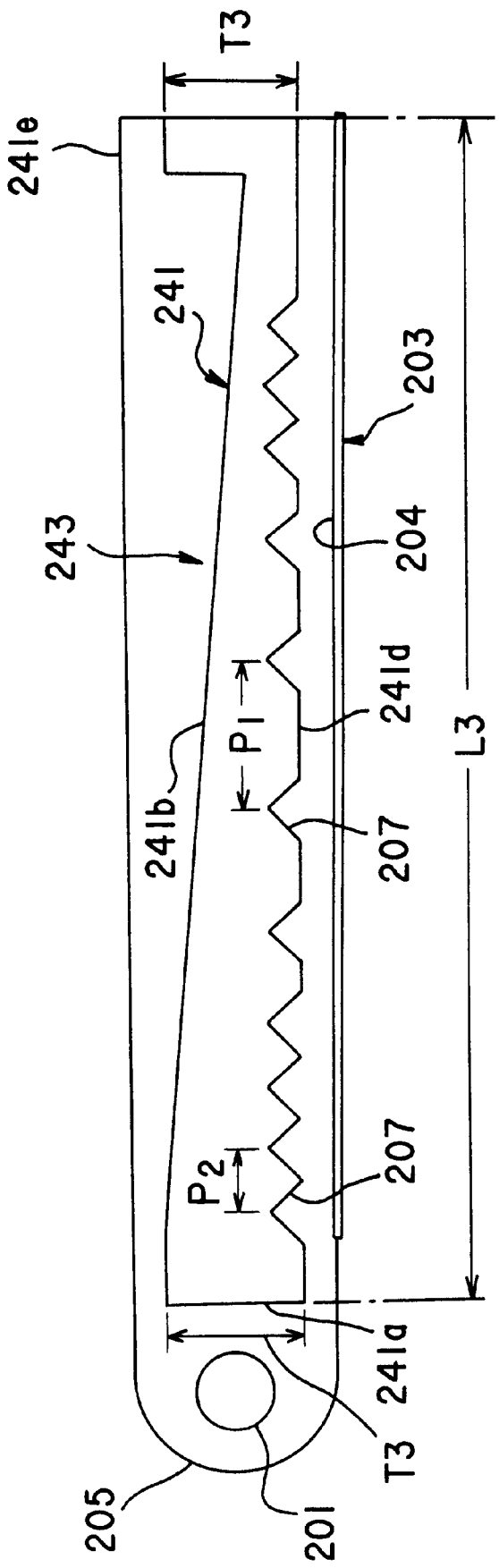
FIG. 44 is a cross-sectional view of a variation of the structure shown in FIG. 30.

The curve of the FIG. 43 can be by a seventh-order approximate expression having the following coefficients $X^7$, $X^6$, $X^5$, $X^4$, $X^3$, $X^2$, $X^1$, $X^0$:

$X^7 = -8.74289\text{E}-15$ $X^6 = 3.86566\text{E}-12$ $X^5 = -5.315\text{E}-10$ $X^4 = 1.20258\text{E}-08$ $X^3 = 2.67616\text{E}-06$ $X^2 = -2.86593\text{E}-04$ $X^1 = 0.014992$ $X^0 = 0.664993$ FIG. 44 shows a variation of the light conducting plate 241 shown in FIG. 30. In FIG. 44, parts that are the same as those shown in FIG. 30 are given the same reference numerals as previously. A projection 241e functioning as a reflection surface is formed at the end opposite to the end thereof facing the light source 201. The projection 241e is integrally formed with the other parts of the light conducting plate 241. The light conducting plate shown in FIG. 44 provides almost the same advantages as those of the light conducting plate shown in FIG. 30.

The length L3 of the two identical light conducting plates 243 is equal to, for example, 210 mm, and the thickness T3 thereof is approximately equal to, for example, 5.0 mm. Further, the width of the light conducting plate 243 is approximately equal to, for example, 160 mm. The angle $\phi$ of the grooves 207 is equal to, for example, 120°, and the depth of the grooves is equal to, for example, 0.025 mm.

Further, it is possible to apply the grooves 207 to the structure shown in FIG. 6A as a diffusion pattern. It is also possible to apply the reflection plate shown in FIG. 41 to the other embodiments, for example, the structure shown in FIG. 2. The linear special linear prism plate 102 shown in FIGS. 18 and 42 can be applied to the other embodiments of the present invention.

The present invention are not limited to the specifically disclosed embodiments, and variations and modifications may be made without departing from the scope of the present invention.

What is claimed is:

1. A lighting device comprising:

a light source;

a light conducting plate having an incident surface receiving light emitted from the light source, a back surface and a light-emitting surface; and a reflection member having a first portion facing the back surface, and a second portion located on a side opposite a side of the light conducting plate on which the light source is located, the light conducting plate comprising an emission area, a light accumulating area and a plurality of concave portions, the plurality of concave portions being provided in the emission area and the light accumulating area of the light conducting plate and orienting light emitted from the light conducting plate via the back surface toward an emission surface of the lighting device; and a cover portion covering the light-emitting surface confronting the light accumulating area of the light conducting plate.

2. The lighting device as claimed in claim 1, wherein each of the concave portions has a groove having a cross section of an approximately triangular shape.

3. The lighting device as claimed in claim 1, further comprising:

a reflection mirror covering the light source and having said cover portion.

4. The lighting device as claimed in claim 1, wherein said light accumulating area comprises at least one concave portion confronting said cover portion.

5. The lighting device as claimed in claim 1, wherein said concave portions are provided intermittently in said light conducting plate.

6. A lighting device comprising:

a light source;

a light conducting plate having an incident surface receiving light emitted from the light source, a back surface and a light-emitting surface;

a reflection member having a first portion facing the back surface, and a second portion located on a side opposite to a side of the light conducting plate on which the light source is located, the light conducting plate comprising an emission area, a light accumulating area, and a plurality of concave portions which are formed on a back surface of the light accumulating area of the light conducting plate and orient light emitted from the light conducting plate via the back surface toward an emission surface of the lighting device; and a reflection mirror which covers the light source and one or more concave portions among the plurality of concave portions.

7. The lighting device as claimed in claim 6, wherein said concave portions are provided intermittently in said light conducting plate.

* * * * *